US009759351B2

(12) United States Patent
Feijen et al.

(10) Patent No.: US 9,759,351 B2
(45) Date of Patent: *Sep. 12, 2017

(54) MARINE PIPELINE INSTALLATION SYSTEM AND METHODS

(71) Applicant: ITREC B.V., Schiedam (NL)

(72) Inventors: Arnoud Laurens Feijen, Rotterdam (NL); Ronny Lambertus Waltherus Nouwens, Schiedam (NL); Terence Willem August Vehmeijer, The Hague (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,435

(22) Filed: May 18, 2016

(65) Prior Publication Data

US 2016/0265691 A1   Sep. 15, 2016

Related U.S. Application Data

(62) Division of application No. 14/543,559, filed on Nov. 17, 2014, now Pat. No. 9,371,939, which is a division
(Continued)

(51) Int. Cl.
*F16L 1/00* (2006.01)
*F16L 1/20* (2006.01)
(Continued)

(52) U.S. Cl.
CPC .............. *F16L 1/205* (2013.01); *B63B 35/03* (2013.01); *F16L 1/12* (2013.01); *F16L 1/16* (2013.01);
(Continued)

(58) Field of Classification Search
CPC ..... F16L 1/205; F16L 1/12; F16L 1/16; F16L 1/202; F16L 1/207; F16L 1/23; F16L 1/235; B63B 35/03
(Continued)

(56) References Cited

U.S. PATENT DOCUMENTS 3,589,136 A   6/1971   Sorenson et al.
3,680,322 A   8/1972   Nolan et al.
(Continued)

FOREIGN PATENT DOCUMENTS

CN   85105011 A    12/1986
CN   101156013 A    4/2008
(Continued)

*Primary Examiner* — Amber Anderson
*Assistant Examiner* — Patrick Lambe
(74) *Attorney, Agent, or Firm* — Birch, Stewart, Kolasch & Birch, LLP

(57) ABSTRACT

A method for installing an accessory onto a pipeline to be laid on the seabed, includes launching the pipeline from a first position of a tower in which the tower is at an angle α with respect to the vertical; stopping the launch of the pipeline, and hanging off the launched pipeline in a hang off module; positioning an accessory in a tower firing line; attaching the accessory to the launched pipeline in the hang off module and to at least one A&R cable; suspending the accessory and the launched pipeline from an A&R system; disengaging the hang off module from the launched pipeline; pivoting the pipeline launch tower to an accessory launch position in which the tower is at an angle γ that differs substantially from angle α, such that a pipeline launch trajectory is created which is large enough to launch the accessory and the launched pipeline with the A&R system.

12 Claims, 11 Drawing Sheets

Related U.S. Application Data of application No. 12/990,052, filed as application No. PCT/NL2008/000117 on Apr. 29, 2008, now Pat. No. 8,915,674.

(51) Int. Cl.
  *F16L 1/16*  (2006.01)
  *B63B 35/03*  (2006.01)
  *F16L 1/12*  (2006.01)
  *F16L 1/23*  (2006.01)
  *F16L 1/235*  (2006.01)

(52) U.S. Cl.
  CPC ............... *F16L 1/202* (2013.01); *F16L 1/207* (2013.01); *F16L 1/23* (2013.01); *F16L 1/235* (2013.01)

(58) Field of Classification Search
  USPC ...................... 405/166, 168.3, 158
  See application file for complete search history.

(56) References Cited

U.S. PATENT DOCUMENTS

| | | |
|---|---|---|
| 4,594,871 A | 6/1986 | de Boer |
| 5,348,423 A | 9/1994 | Maloberti et al. |
| 5,464,307 A | 11/1995 | Wilkins |
| 5,533,834 A | 7/1996 | Recalde |
| 5,836,719 A | 11/1998 | Martin et al. |
| 6,352,388 B1 | 3/2002 | Seguin |
| 6,361,250 B1 | 3/2002 | de Varax |
| 6,592,297 B2 | 7/2003 | Frijns et al. |
| 6,702,519 B2 | 3/2004 | Stockstill |
| 6,733,208 B2 | 5/2004 | Stockstill |
| 6,796,742 B1 | 9/2004 | Roger et al. |
| 7,581,904 B2 | 9/2009 | Bursaux et al. |
| 8,251,613 B2 | 8/2012 | Narold et al. |
| 2002/0021942 A1 | 2/2002 | Willis et al. |
| 2002/0021943 A1 | 2/2002 | Frijns |
| 2002/0090269 A1 | 7/2002 | Kuppers |
| 2002/0159839 A1 | 10/2002 | Frijns et al. |
| 2005/0126790 A1 | 6/2005 | Beato et al. |
| 2005/0207849 A1 | 9/2005 | Roodenburg et al. |
| 2008/0304912 A1 | 12/2008 | Roodenburg et al. |
| 2010/0054861 A1 | 3/2010 | Ardavanis et al. |

FOREIGN PATENT DOCUMENTS

| | | |
|---|---|---|
| EP | 1722144 A1 | 11/2006 |
| WO | WO 03/087652 A2 | 10/2003 |
| WO | WO 2007/108673 A1 | 9/2007 |
| WO | WO 2009/022175 A1 | 2/2009 |
| WO | WO 2009/022177 A2 | 2/2009 |

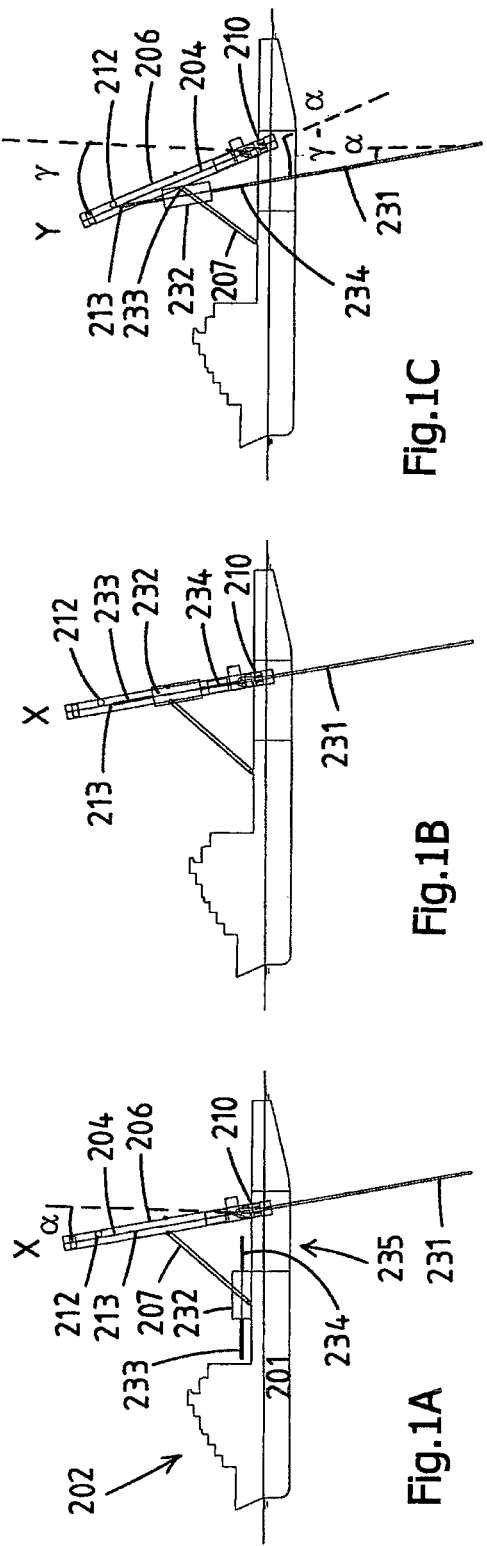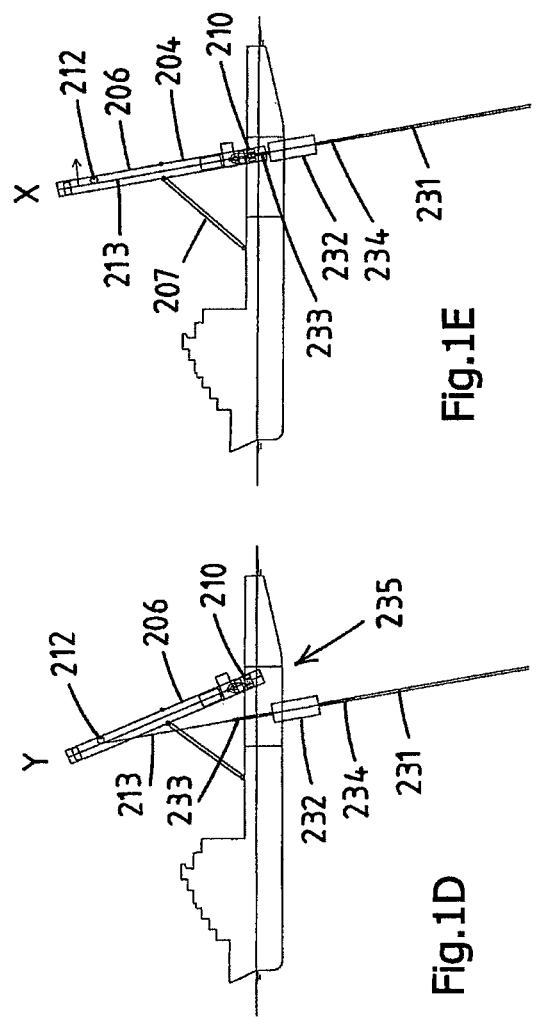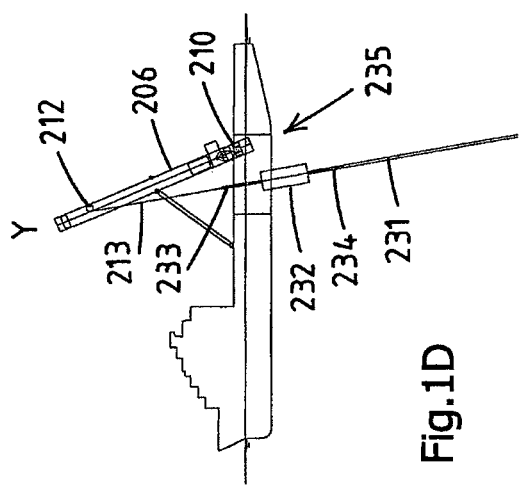

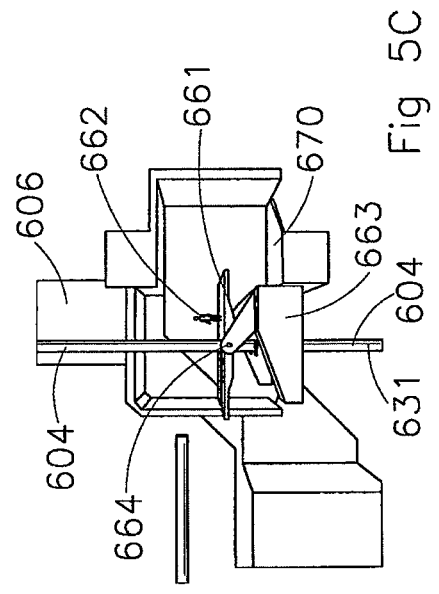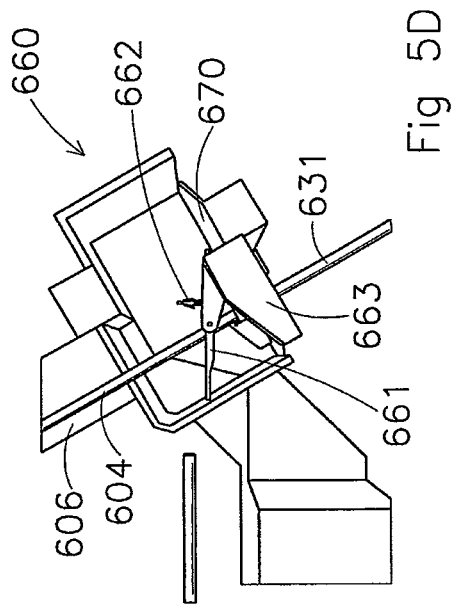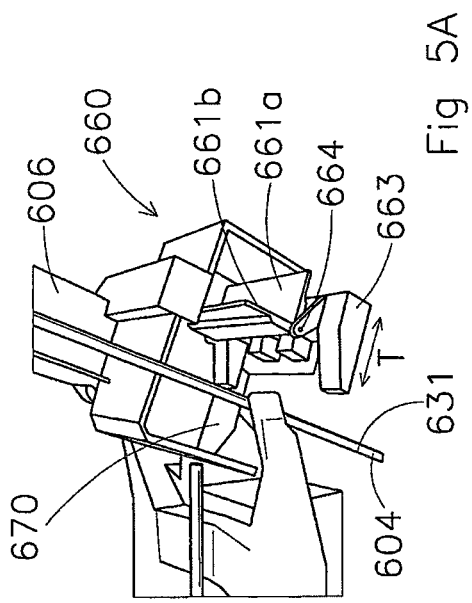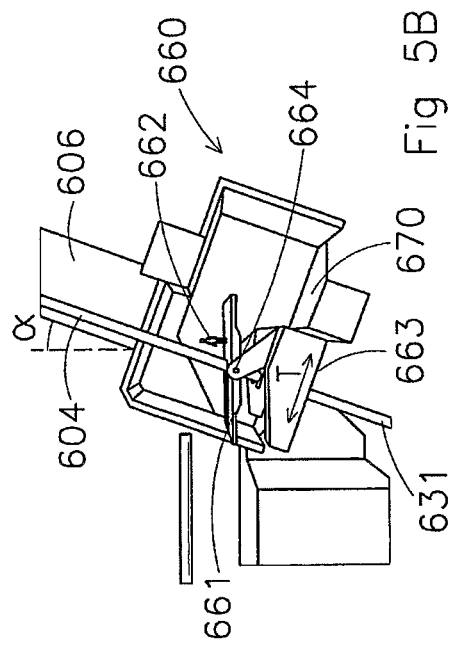

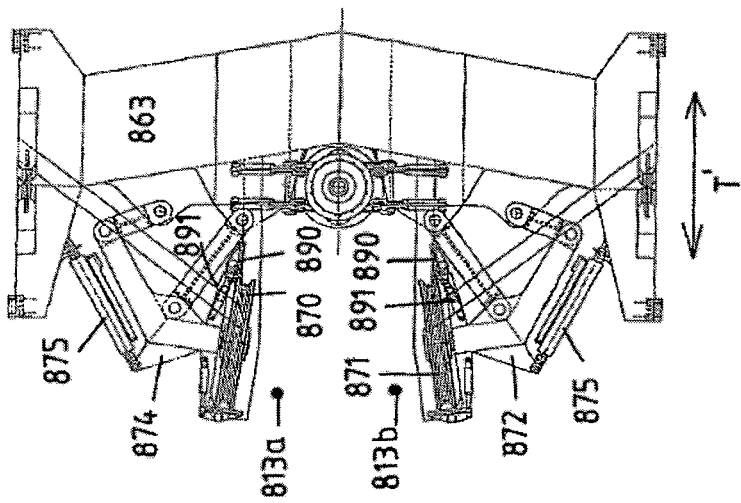
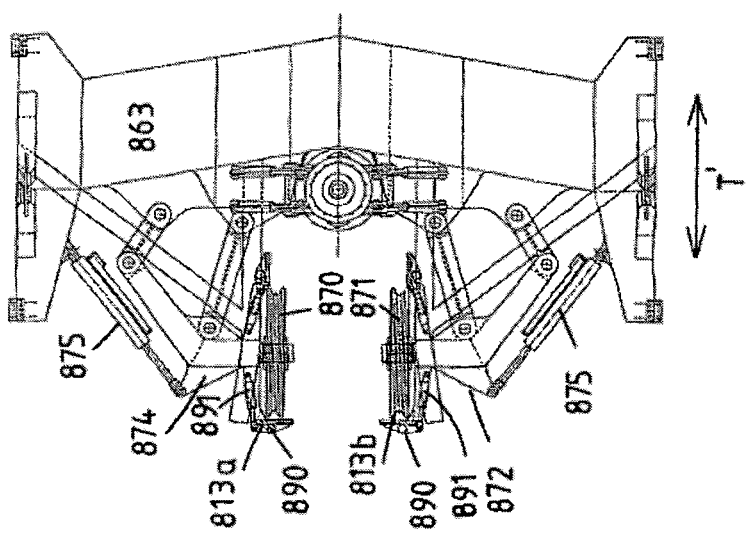
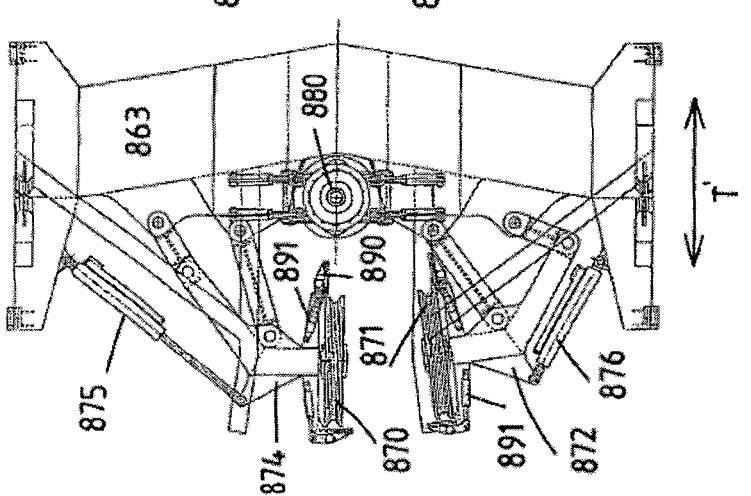

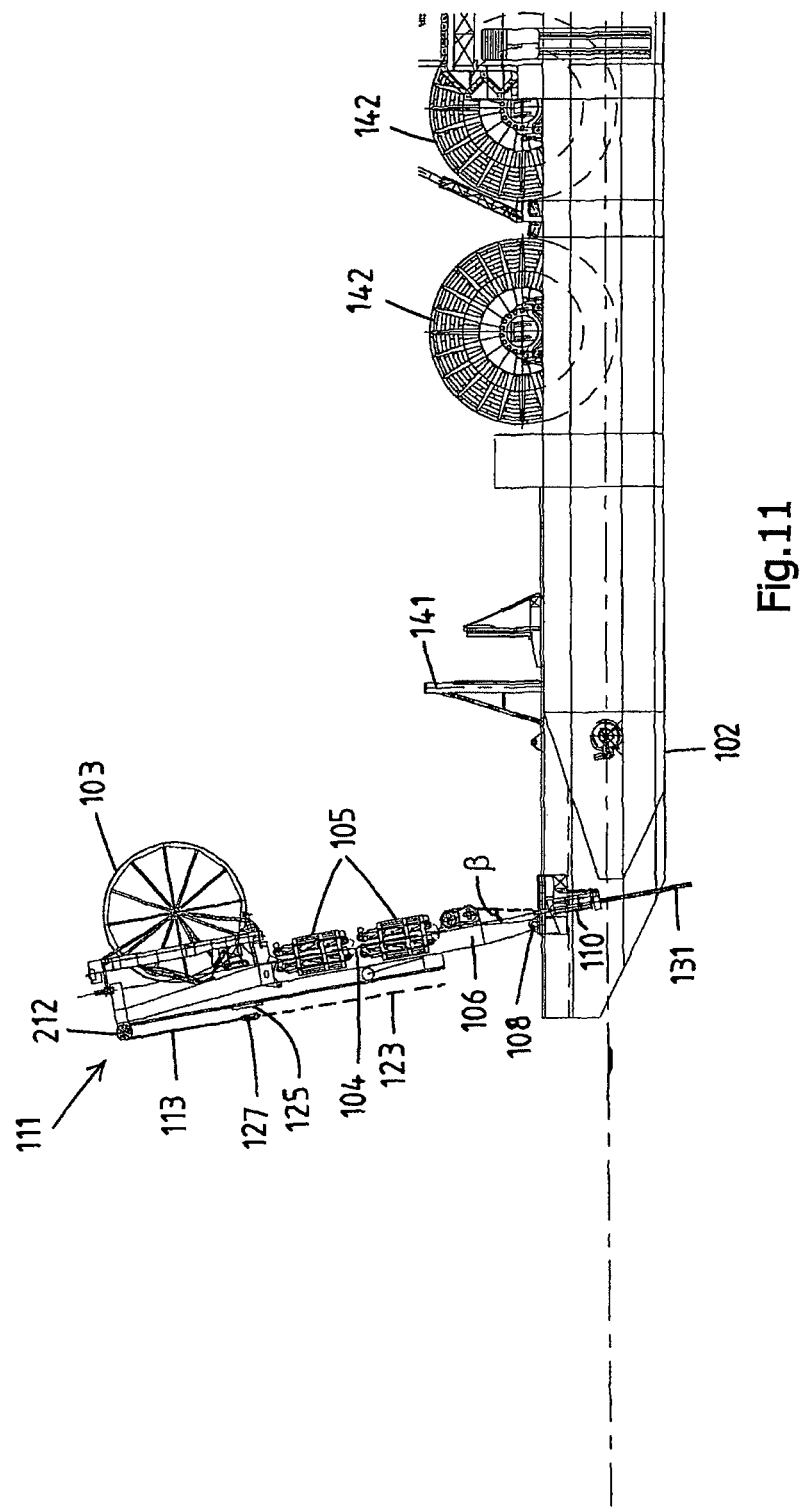

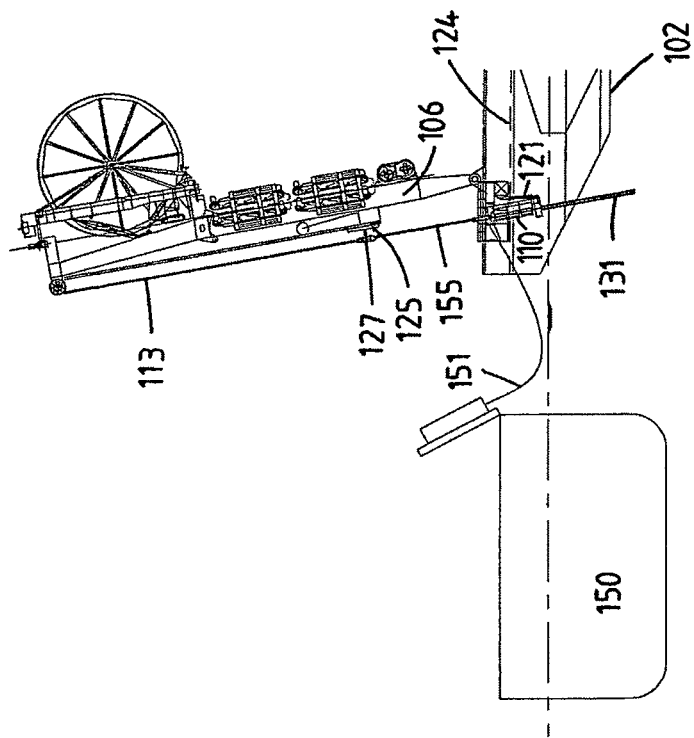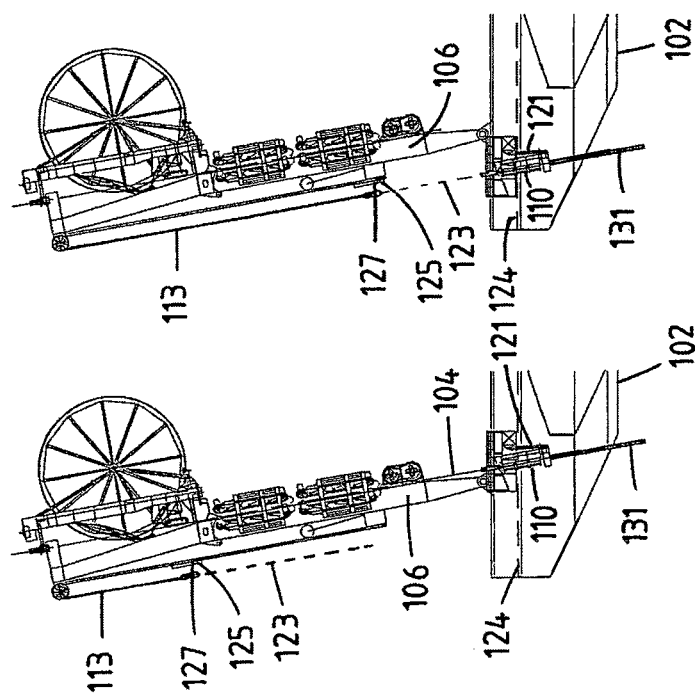
Fig.12A  Fig.12B  Fig.12C

MARINE PIPELINE INSTALLATION SYSTEM AND METHODS

CROSS-REFERENCE TO RELATED APPLICATION

This application is a divisional of co-pending U.S. patent application Ser. No. 14/543,559, filed on Nov. 17, 2014, which is a divisional of U.S. patent application Ser. No. 12/990,052 filed on Jan. 7, 2011 (now U.S. Pat. No. 8,915, 674, issued on Dec. 23, 2014), which is the National Phase of PCT/NL2008/000117 filed on Apr. 29, 2008, all of which are hereby expressly incorporated by reference into the present application.

A first aspect of the invention relates to a method for installing an accessory onto a pipeline to be laid on the seabed, wherein use is made of a marine pipeline installation system for laying an offshore pipeline comprising:
  a vessel,
  a pipeline launch tower having pipe laying equipment defining a tower firing line, which tower is mounted pivotably on said vessel and which is adapted for launching the pipeline along the tower firing line into the sea in a first position of the tower in which the tower is at an angle $\alpha$ with respect to the vertical,
  a hang off module supported in the lower part of the firing line for clamping and supporting the weight of previously launched pipeline,
  an abandonment and recovery (A&R) system comprising at least one A&R cable and a sheave arrangement with one or more sheaves provided at an upper position in the firing line,
  an accessory handling device for positioning the accessory between the hang off module and the abandonment and recovery sheave arrangement in the firing line.

Such marine pipeline installation systems are well known in the art, preferably for laying an offshore pipeline and/or installing a subsea riser. Such a system comprises a vessel having a bow and a stern, which vessel may be suitable to carry out the reel lay method, laying rigid or flexible pipelines, but may also be suitable to carry out the J-lay method.

The system further comprises a pipeline launch tower comprising pipe laying equipment defining a tower firing line, which tower is mounted pivotably on said vessel. The tower is adapted for launching the pipeline in the firing line in the direction of the seabed in a first position of the tower in which the tower is at an angle $\alpha$ with respect to the vertical.

The pipe laying equipment may comprise tensioners, e.g. when the tower is used for reel laying operations, and may furthermore include welding stations and line-up tools, e.g. when the tower is used for J-lay operations. Furthermore, the pipe laying equipment may include clamps such as a hang off module clamp provided in a hang off module.

Such a tower is often placed adjacent or over a moonpool of the vessel, or at another suitable location, e.g. at the stern of the vessel. In general the term tower here refers to a raised structure on the vessel, and may e.g. be designed as a reel lay ramp. Alternatively or in addition, the tower may be formed by an A-frame.

A hang off module is supported in the lower part of the firing line to support a previously launched pipeline. Such a hang off module may be allowed to engage with the launched pipeline, e.g. by clamping. In a possible embodiment, the hang off module is supported by the vessel and comprises associated hang off module pivoting means to pivot the hang off module together with or independent of the tower. In an alternative embodiment, the hang off module is supported by the pipeline launch tower and is pivotable together with the tower.

The pipeline launch tower supports an abandonment and recovery (A&R) system comprising at least one A&R cable and a sheave arrangement, comprising one or more A&R sheaves. Such A&R system can be used for lowering the launched pipeline, accessories, or launched pipeline provided with an accessory. Examples of such accessories are pipeline end terminals (PLET's) and connectors. Preferably, the A&R sheave arrangement is provided at an upper position of the pipeline launch tower, such that the accessory is positionable below the sheave arrangement.

Accessories may be stored on the deck area or alternatively on a barge. Such accessories are positioned in the firing line between the hang off module and the abandonment and recovery sheave arrangement by an accessory handling device. The accessory may be delivered to the accessory handling device by a crane, such as an offshore mast crane or a knuckle boom crane, or via an A&R cable in the A&R system. Possibly also the accessory handling device is skiddable into the firing line.

The first aspect of present invention aims to provide an improved method for installing accessories onto a pipeline to be laid on the seabed, or at least an alternative method.

The method according to the first aspect of the invention comprises the following steps:
  launching the pipeline from the first position of the tower in which the tower is at an angle $\alpha$ with respect to the vertical, in a pipeline launch trajectory corresponding to the tower firing line into the sea,
  stopping the launch of pipeline, and hanging off the launched pipeline in the hang off module,
  positioning the accessory in the tower firing line,
  attaching the accessory to the launched pipeline in the hang off module and to the at least one A&R cable,
  suspending the accessory and the launched pipeline from the A&R system,
  disengaging the hang off module from the launched pipeline,
  pivoting the pipeline launch tower to an accessory launch position in which the tower is at an angle $\gamma$ with respect to the vertical, which angle $\gamma$ differs substantially from angle $\alpha$, such that a pipeline launch trajectory is created which is large enough to launch the accessory and the launched pipeline with the A&R system,
  lowering the accessory with the launched pipeline by the A&R system.

This way, the accessory and the launched pipeline suspending from the A&R system are at a distance from the tower. The line in which the accessory and the launched pipeline suspend from the A&R system may be referred to as the A&R line. Rotating the pipeline launch tower away from the pipeline launch trajectory in which an accessory is installed onto a pipeline facilitates the lowering of accessories. The firing line of the tower is at an angle with the pipeline launch trajectory, possibly angle ($\gamma$-$\alpha$), which angle preferably exceeds 7° and more preferably exceeds 15°, such that a pipeline launch trajectory is created which is large enough to launch the accessory and the launched pipeline with the A&R system. This is in particular beneficial when the space available in the tower firing line is limited, and large accessories are to be handled. The more the pipeline launch tower is pivoted, the more the A&R line is remote from the tower firing line. Another advantage may be that is not necessary to remove the pipelaying equipment from the firing line, e.g. by displacement or by disengagement. In a preferred embodiment, relatively small accessories may be launched in the firing line of the tower in the pipeline launch trajectory, while the tower is pivoted to the accessory launch position to launch relatively large accessories.

In a preferred embodiment, the A&R line extends well beyond the stern or the bow of the vessel, or beyond the gangways. Large, oversized accessories such as PLETs, which e.g. do not fit in between the legs of the pipeline launch tower or ramp may thus be installed at a remote launch trajectory: the A&R line.

Preferably, when the accessory comprises a pipe end portion, the method according to the first aspect of the invention further comprises the steps of:
- launching the accessory and the launched pipeline by the A&R cable until the pipe end portion is at the same height level as the position of the hang off module,
- pivoting the pipeline launch tower from the accessory launch position in which the tower is at an angle γ with respect to the vertical back to the first position in which the tower is at an angle α with respect to the vertical, such that the pipeline launch trajectory again coincides with the firing line of the tower,
- engaging the pipe end portion to the hang off module,
- detaching the A&R cable from the accessory.

In a preferred embodiment according to the first aspect of the invention the tower includes in the first position an acute angle α with the intended direction of movement of the vessel during pipelaying, wherein the tower is pivoted to a less acute angle γ or to a more acute angle γ in the accessory launch position of the tower, such that the firing line of the tower is at an angle, preferably angle (γ-α) with the pipeline launch trajectory, such that a pipeline launch trajectory is created which is large enough to launch the accessory and the launched pipeline with the A&R system.

Alternatively, the tower includes in the first position an obtuse angle α with the intended direction of movement of the vessel during pipelaying, and wherein the tower is pivoted to a less obtuse angle γ or to a more obtuse angle γ in the accessory launch position of the tower, such that the firing line of the tower is at an angle (γ-α) with the pipeline launch trajectory.

In yet an alternative embodiment, the tower includes in the first position an acute angle α with the intended direction of movement of the vessel during pipelaying, and wherein the tower is pivoted to an obtuse angle γ in the accessory launch position of the tower.

Analogously, in yet an alternative embodiment, the tower includes in the first position an obtuse angle α with the intended direction of movement of the vessel during pipelaying, and wherein the tower is pivoted to an acute angle γ in the accessory launch position of the tower.

A second aspect of the invention relates to a marine pipeline installation system for laying an offshore pipeline, preferably for laying an offshore pipeline and/or installing a subsea riser. Such a system comprises a vessel, which vessel may be suitable to carry out the reel lay method, laying rigid or flexible pipelines, but may also be suitable to carry out the J-lay method.

The system further comprises a pipeline launch tower comprising pipe laying equipment defining a tower firing line, which tower is mounted pivotably about a pivot axis on said vessel. The tower is adapted for launching the pipeline in the firing line in the direction of the seabed in a first position of the tower in which the tower is at an angle α with respect to the vertical. The pipe laying equipment may comprise tensioners, e.g. when the tower is used for reel laying operations, and may furthermore include welding stations and line-up tools, e.g. when the tower is used for J-lay operations. Furthermore, the pipe laying equipment may include clamps such as a hang off module clamp provided in a hang off module.

Such a tower is often placed adjacent or over a moonpool of the vessel, or at another suitable location, e.g. at the stern of the vessel. In general the term tower here refers to a raised structure on the vessel, and may e.g. be designed as a reel lay ramp. Alternatively or in addition, the tower may be formed by an A-frame.

The marine pipeline installation system according to the second aspect of the invention further comprises a workstation comprising a working platform supported by a support frame and accessible to personnel to perform inspection operations etc., which workstation is supported in the lower part of the pipeline launch tower. The working station may further comprise welding equipment for welding pipe sections to each other or to accessories.

Furthermore, the marine pipeline installation system comprises a hang off module supported by the support frame in the lower part of the tower firing line for clamping and supporting the weight of the previously launched pipeline.

The second aspect of the present invention aims to provide an improved marine pipelaying system, or at least an alternative system.

According to the second aspect of the invention the support frame is skiddable along a support frame guide provided in the lower part of the pipeline launch tower, which support frame guide is substantially perpendicular to the tower pivot axis and substantially perpendicular to the tower firing line, such that the working platform and the hang off module are skiddable into and out of the tower firing line.

Thus, the second aspect of the invention provides a system allowing a working platform to be positioned into the tower firing line, enabling almost or full 360° inspection of a pipeline in the tower firing line when the working platform is positioned into the tower firing line. The working platform may comprise a slot at the tower firing line side of the working platform to receive a pipeline in the tower firing line when the working platform is positioned in the tower firing line. This makes it easier for personnel to get near the pipeline from different directions.

The ability to position the working platform out of the tower firing line is advantageous when for instance an accessory or thickening in the pipeline has to pass the working station. The working platform is then positioned out of the tower firing line, such that the working platform is not interfering with the accessory or thickening.

Preferably, a platform pivot axis parallel to the tower pivot axis is provided between the support frame and the working platform, such that the working platform can gimbal maintaining a horizontal position independent of the position of the tower. The pipeline launch tower is mounted pivotably about a pivot axis and can take many positions with respect to the vessel, which can also be changed during normal operations. To move naturally across the working platform during inspection operations etc., the working platform needs to be placed substantially horizontal independent of the position of the tower. The platform pivot axis allows this independent movement. The relative movement of the working platform with respect to the tower can be achieved by gimbal means, comprising preferably a cylinder or a gear wheel and motor. Other gimbal means to pivot the working platform relatively with respect to the tower are also conceivable.

In an embodiment, the working platform comprises two platform portions between which a swinging axis parallel to the tower pivot axis is provided, such that the platform portion closest to the tower firing line can be swung back so as to clear the area around the tower firing line. The advantage is that with a relatively large working platform and relatively little movement of the working platform along the support frame guide, enough area is cleared around the tower firing line, because the platform portion closest to the tower firing line can be swung back.

The swinging axis preferably coincides with the platform pivot axis, but the swinging axis may also be located between the platform pivot axis and the free end of the platform portion closest to the tower firing line.

If the platform portion closest to the tower firing line comprises a slot which extends from the free end of the working platform to the swinging axis, the platform portion is divided into two parts which may be swung back independent from each other.

In an embodiment, the marine pipeline installation system further comprises an abandonment and recovery (A&R) system comprising at least one A&R cable and a sheave arrangement with one or more sheaves supported by the pipeline launch tower.

Preferably, the support frame further supports one or more of the A&R sheaves, such that the one or more sheaves supported by the support frame are skiddable into and out of the tower firing line. The sheaves supported by the support frame can guide the A&R cable, which is especially advantageous when the tower is in an inclined position.

The mobility of the support frame allows to adapt the position of the one or more sheaves supported by the support frame, such that the position of the one or more sheaves is adaptable to the position of the at least one A&R cable to be guided by the one or more sheaves. Thus, the A&R cable can pass the sheaves supported by the support frame at two sides, dependent on the angle of the tower.

The third aspect of the invention relates to a marine pipeline installation system for laying an offshore pipeline, preferably for laying an offshore pipeline and/or installing a subsea riser. Such a system comprises a vessel, which vessel may be suitable to carry out the reel lay method, laying rigid or flexible pipelines, but may also be suitable to carry out the J-lay method.

The system further comprises a pipeline launch tower comprising pipe laying equipment defining a tower firing line, which tower is mounted pivotably about a pivot axis on said vessel. The tower is adapted for launching the pipeline in the tower firing line in the direction of the seabed in a first position of the tower in which the tower is at an angle α with respect to the vertical. The pipe laying equipment may comprise tensioners, e.g. when the tower is used for reel laying operations, and may furthermore include welding stations and line-up tools, e.g. when the tower is used for J-lay operations. Furthermore, the pipe laying equipment may include clamps such as a hang off module clamp provided in a hang off module.

Such a tower is often placed adjacent or over a moonpool of the vessel, or at another suitable location, e.g. at the stern of the vessel. In general the term tower here refers to a raised structure on the vessel, and may e.g. be designed as a reel lay ramp. Alternatively or in addition, the tower may be formed by an A-frame.

Furthermore, the system comprises an abandonment and recovery (A&R) system comprising at least one A&R cable and a sheave arrangement with one or more sheaves supported by the pipeline launch tower. Most conventional marine pipeline installation systems provide the entire A&R sheave arrangement at an upper position of the pipeline launch tower. A disadvantage sheaves only provided at an upper position of the pipeline launch tower is that this possibly causes A&R cables to scrap along the ramp or edges of the vessel, or, when the pipeline launch trajectory passes a moonpool, along the edges of the moonpool, even with small off lead and side lead angles.

Furthermore, the marine pipeline installation system comprises a hang off module supported by the support frame in the lower part of the tower firing line for clamping and supporting the weight of the previously launched pipeline.

The third aspect of the present invention aims to provide an improved marine pipelaying system, or at least an alternative system.

According to the third aspect of the invention the hang off module and one or more of the sheaves having a sheave pivot axis substantially parallel to the tower pivot axis are supported by a support frame, which is skiddable along a support frame guide provided in a lower part of the pipeline launch tower, which guide is substantially perpendicular to the tower pivot axis and substantially perpendicular to the tower firing line, such that the one or more sheaves and the hang off module supported by the support frame are skiddable into and out of the tower firing line.

The provision of one or more sheaves provided at the lower part of the tower guiding the cables from the upper A&R sheaves along the pipeline launch tower allows restraining of the A&R wire at a lower position than at an upper position of the pipeline launch tower, increasing vessel stability significantly. Preferably, the distance between the sheaves provided at the upper part of the tower and the lower part of the tower is such that accessories may be positioned between the sheaves.

The advantage of supporting one or more sheaves by the support frame is that the sheaves can be moved into and out of the tower firing line, enabling the passage of an accessory or thickening in the pipeline.

Because the pipeline launch tower can pivot to both positive and negative angles with respect to the vertical, it is advantageous to be able to guide the at least one A&R cable for both angles of the tower. This is possible according to a preferred embodiment of the third aspect of the invention, wherein at least one of the sheaves supported by the support frame is adapted to guide the at least one A&R cable at opposite sides of the sheave, and the support frame is at least skiddable between a position in which the at least one A&R cable is guided by a first side of the sheave and another position in which the at least one A&R cable is guided by an opposite side of the sheave.

In an embodiment, at least one of the sheaves supported by the support frame is movable in a direction substantially parallel to the tower pivot axis. In this way, the at least one movable sheave can be lined up with an A&R cable, but can also be deliberately misaligned to be able to pass the A&R cable, get lined up again, and then guide the A&R cable at the other side of the A&R cable.

In another embodiment, two sheaves are supported by the support frame, at least one of which is moveable in a direction substantially parallel to the tower pivot axis, such that the A&R system is adjustable from a single fall system in which the moveable sheave is positioned adjacent a single A&R cable to guide this single A&R cable, to a double fall system in which the two sheaves are positioned adjacent two A&R cables to guide these two A&R cables.

The support frame may further support a working platform accessible to personnel to perform inspection operations etc., such that the working platform is skiddable into and out of the tower firing line.

The ability to position the working platform out of the tower firing line is advantageous when for instance an accessory or thickening in the pipeline has to pass the working station. The working platform is then positioned out of the tower firing line, such that the working platform is not interfering with the accessory or thickening.

Preferably, a platform pivot axis parallel to the tower pivot axis is provided between the support frame and the working platform, such that the working platform can gimbal maintaining a horizontal position independent of the position of the tower. The pipeline launch tower is mounted pivotably about a pivot axis and can take many positions with respect to the vessel, which can also be changed during normal operations. To move naturally across the working platform during inspection operations etc., the working platform needs to be placed substantially horizontal independent of the position of the tower. The platform pivot axis allows this independent movement. The relative movement of the working platform with respect to the tower can be achieved by gimbal means, comprising preferably a cylinder or a gear wheel and motor. Other gimbal means to pivot the working platform relatively with respect to the tower are also conceivable.

In an embodiment, the working platform comprises two platform portions between which a swinging axis parallel to the tower pivot axis is provided, such that the platform portion closest to the tower firing line can be swung back so as to clear the area around the tower firing line. The advantage is that with a relatively large working platform and relatively little movement of the working platform along the support frame guide, enough area is cleared around the tower firing line, because the platform portion closest to the tower firing line can be swung back.

The swinging axis preferably coincides with the platform pivot axis, but the swinging axis may also be located between the platform pivot axis and the free end of the platform portion closest to the tower firing line.

If the platform portion closest to the tower firing line comprises a slot which extends from the free end of the working platform to the swinging axis, the platform portion is divided into two parts which may be swung back independent from each other.

A fourth aspect of the present invention relates to the field of marine pipeline installation, in particular for laying an offshore pipeline and/or installing a subsea riser, said system at least being adapted to carry out the reel lay method. The system according to the fourth aspect of the present invention may be suitable for laying flexible pipelines but also for laying rigid pipelines with the reel lay method. In particular is the system according to the fourth aspect of the present invention suitable for laying pipelines with a steel overall diameter ranging from 5-100 cm, preferably 10-50 cm and a maximum plastic bending moment of 5000 kNm, preferably 3000 kNm.

From the prior art reel lay vessels are known for laying a pipeline on the seabed according to the reel lay method. These vessels commonly are equipped with one or more storage reels for storage of pipeline to be installed. Such reels may store several hundreds of tons of pipeline, e.g. 3500 metric tons.

The vessels also are equipped with a pipeline launch tower comprising pipe laying equipment defining a firing line, which tower is mounted pivotably on said vessel and which is adapted for launching the pipeline from a storage reel via the firing line in the direction of the seabed in a first position in which the tower is at an angle $\alpha$ with respect to the vertical. The actual trajectory of the pipeline is also referred to as the pipeline launch trajectory, which thus during launch coincides with the firing line.

The angle $\alpha$ may be such that the tower includes an acute angle with the deck of the vessel or alternatively an obtuse angle. The tower may be pivoted to include an acute or obtuse angle with the direction of movement of the vessel during pipelaying. The tower may be pivoted along the longitudinal axis of the vessel or alternatively be pivoted perpendicular to the longitudinal axis of the vessel as is e.g. the case on the Pertinacia.

Such a tower may be placed adjacent or over a moonpool of the vessel, or at any other suitable location, e.g. at the stern of the vessel, or at the bow, or at one of the side parts. In general the term tower here refers to a raised structure on the vessel, and may e.g. be designed as a reel lay ramp. Alternatively or in addition, the tower may be formed by an A-frame.

The pipe laying equipment for such a marine pipeline installation system comprises a pipeline guide provided at an elevated position on said tower providing a curved path for guiding said pipeline from the reel in the firing line of said tower. Known pipeline guides include a large diameter pipeline guide wheel or a semi-circular guide structure, e.g. provided with rollers or chains. Such pipeline guide is sometimes referred to as an aligner.

In known reel lay pipelaying systems the pipe laying equipment further comprises one or more pipeline tensioners, commonly two but versions with one or three are also known, which are supported by the tower at different heights below the pipeline guide.

In a common design each pipeline tensioner has a tensioner frame and multiple tracks (also called caterpillars), often three or four tracks, supported by said tensioner frame. The tracks are adapted for engaging the pipeline and supporting at least part of the weight of the launched pipeline. In practice a single tensioner can be designed to support a pipeline weight of more than 50 tons, and tensioner capacities of more than 100 tons, even up to 450 tons are also not uncommon.

The tracks are mounted in said tensioner frame in a movable manner in order to allow for adjustment of the gap between the tracks to accommodate various pipeline diameters.

The present invention aims to provide an improved marine pipelaying system, or at least an alternative system.

The present invention provides according to a fourth aspect thereof a system for marine pipeline installation on which the pipeline launch tower is pivotable to a second position in which the tower is at an angle $\beta$ with respect to the vertical, which angle $\beta$ is opposite to angle $\alpha$, in which second position the pipeline can also be launched from a storage reel into the sea.

Thus, according to the fourth aspect of the invention in the first position of the tower the tower may be inclined at a range of angles below vertical, allowing the launch of pipeline in many positions of the tower. The inclination a may be in the range between 0 and 70°, more preferably between 0 and 15°, whereby an inclination of 0° corresponds to a vertical orientation of the pipeline launch tower. In the second position the tower may be inclined at a range of angles below vertical, opposite to the first position.

Thus, where a tower positioned at an edge of the vessel (the bow, the stern or a side of the vessel) is pivoted to include an acute angle with the deck in the first position, in the second position the tower includes an obtuse angle with the deck. Analogously, the tower may include an obtuse angle with the deck in the first position and an acute angle in the second position. In a preferred embodiment, the pipeline launch tower is positioned at the stern of the vessel and is pivotable between a position in which the tower is positioned inclined with respect to the bow with 65° to a second position in which the tower is leaning backwards and extending over the stern with 15°.

In a preferred embodiment, the tower is pivoted in the first position to include an acute angle with the forward direction of movement of the vessel during pipelaying, and in the second position to include an obtuse angle with the forward direction of movement of the vessel during pipelaying.

The invention thus allows pipelaying during a forward movement of the vessel and during a rearward movement of the vessel. This may in particular be advantageous when little space is available, e.g. close to existing offshore installations. It may also prevent unnecessary manoeuvring of the vessel. In pipe laying operations usually the speed of the reel is set by the operator, and the tensioners follow the speed of the reel to maintain a constant back tension. This is controlled by a control system. Backward laying operations allow the vessel to sail backwards to a platform while laying pipe and when it arrives at the platform the pipe can be handed over to the platform relatively easy.

A hang off module may be supported below the tensioners in the firing line to support a previously launched pipeline. Such a hang off module may be allowed to engage with the launched pipeline, preferably by clamping. In a possible embodiment, the hang off module is supported by the vessel and comprises associated hang off module pivoting means to pivot the hang off module together with or independent from the tower. In an alternative embodiment, the hang off module is supported by the pipeline launch tower and is pivotable together with the tower.

In a particular embodiment the tensioner frame is designed 'oversized' with respect to regular pipeline diameters, so that the gap between the tracks can be increased to a large size which allows for the passage of an accessory fitted on (the end of) or in the pipeline, e.g. a connector on the end of or in a flexible pipeline. Such connectors are bulky and have a diameter substantially greater than the pipeline diameter, e.g. having a diameter of more than 1 meter for connectors in flexible offshore pipeline. Thus, the tensioners may allow the passage of the connection devices while tension is maintained. When the connecting device has passed the tensioners, the hang off module is activated. The end connections, possibly including a few meters of pipe that has to be removed due to straightening inaccuracies, caused by the pipe connection, are removed and the pipe ends are welded together.

It is common for pipeline launch towers to further support an abandonment and recovery (A&R) system comprising one or more A&R cables and a sheave arrangement, comprising one or more A&R sheaves. Such A&R sheave arrangement can be used for lowering the launched pipeline, accessories, or launched pipeline provided with an accessory. Examples of such accessories are pipeline end terminals (PLET's) and connectors. Preferably, the A&R sheave arrangement is provided at an upper position of the pipeline launch tower, such that the accessory is positionable below the sheave arrangement.

A preferred embodiment of the pipeline launch tower used for laying rigid pipes further carries a radius controller and/or one or more straightener tracks for conditioning the rigid pipe at a position upstream of the one or more tensioners.

It is preferred to have a crane, preferably an offshore mast crane, provided on deck for performing various operations on deck, as well as from and to the vessel. The capacity of such crane may be several hundreds of tons. In preferred embodiments, the crane is used to move large objects to the pipeline launch trajectory.

A fifth aspect of the invention relates to a marine pipeline installation system, preferably for laying an offshore pipeline and/or installing a subsea riser. Such a system comprises a vessel, which vessel may be suitable to carry out the reel lay method, laying rigid or flexible pipelines, but may also be suitable to carry out the J-lay method.

The system further comprises a pipeline launch tower comprising pipe laying equipment defining a tower firing line, which tower is mounted pivotably on said vessel. The tower is adapted for launching the pipeline in the firing line in the direction of the seabed in a first position of the tower in which the tower is at an angle α with respect to the vertical. In the first position of the tower the tower may be inclined at a range of angles below vertical, allowing the launch of pipeline in many positions of the tower. The inclination α may be in the range between 0 and 70°, more preferably between 0 and 15°, whereby an inclination of 0° corresponds to a vertical orientation of the pipeline launch tower.

The pipe laying equipment may comprise tensioners, e.g. when the tower is used for reel laying operations, and may furthermore include welding stations and line-up tools, e.g. when the tower is used for J-lay operations. Furthermore, the pipe laying equipment may include clamps such as a hang off module clamp provided in a hang off module.

Such a tower is often placed adjacent or over a moonpool of the vessel, or at another suitable location, e.g. at the stern of the vessel. In general the term tower here refers to a raised structure on the vessel, and may e.g. be designed as a reel lay ramp. Alternatively or in addition, the tower may be formed by an A-frame.

The pipeline launch tower supports an abandonment and recovery (A&R) system comprising at least one A&R cable and a sheave arrangement, comprising one or more A&R sheaves. Such A&R sheave arrangement can be used for lowering the launched pipeline, accessories, or launched pipeline provided with an accessory. Examples of such accessories are pipeline end terminals (PLET's) and connectors. At least one A&R sheave is provided at an upper position of the pipeline launch tower, allowing the handling of large objects on deck. Most conventional marine pipeline installation systems provide the entire A&R sheave arrangement at an upper position of the pipeline launch tower, such that the accessory is positionable below the sheave arrangement. Alternatively, the entire A&R sheave arrangement is positioned at an intermediate position in the tower, or not supported by the pipeline launch tower at all.

The fifth aspect of present invention aims to provide an improved marine pipelaying system, or at least an alternative system.

The present invention provides according to the fifth aspect thereof relates to an abandonment and recovery sheave arrangement wherein one or more sheaves of the A&R sheave arrangement are provided at an upper position of the pipeline launch tower, and one or more other sheaves of the A&R sheave arrangement are provided on an A&R trolley which is supported by the pipeline launch tower and moveable substantially parallel to the tower firing line. Preferably, an A&R trolley rail is provided at the pipeline launch tower along which the A&R trolley is moveable.

With one or more sheaves of the A&R sheave arrangement are provided at an upper position of the pipeline launch tower an accessory is positionable below the sheave arrangement and the handling of large objects on deck is possible.

Most conventional marine pipeline installation systems provide the entire A&R sheave arrangement at an upper position of the pipeline launch tower, such that the accessory is positionable below the sheave arrangement. However, this would cause A&R wires to scrap along the ramp or edges of the vessel, or, when the pipeline launch trajectory passes a moonpool, along the edges of the moonpool, even with small off lead and side lead angles.

To prevent this, according to the fifth aspect of the invention an A&R trolley is provided that guides the wires from the upper A&R sheaves along the pipeline launch tower. The trolley allows restraining of the A&R wire at a lower position than at an upper position of the pipeline launch tower, increasing vessel stability significantly.

Preferably, the trolley can be locked in its lowest position, for example with pins, to take the full A&R off lead and side lead forces.

In a preferred embodiment, an A&R trolley winch with a constant tension control (heave compensation) is provided to move the A&R trolley along the pipeline launch tower. Such a dedicated winch with a constant tension control preferably fully compensates heave of the vessel. This may in particular be advantageous in an arrangement when two A&R winches are used simultaneously, whereby the wire of one of the winches is reeved through an equalizing sheave and is connected to the wire of the second winch. The winches may be operated synchronously by using pulse counters in the top sheaves. With constant tension control the A&R trolley will remain in contact with the equalizing block. Alternatively, the A&R trolley is moved up and down by an A&R hoist associated with the A&R sheave assembly, reducing the A&R hoist capacity due to the weight of the trolley and the sheave efficiencies.

In a preferred embodiment of the invention according to the fifth aspect, the pipeline launch tower is pivotable to a second position in which the tower is at an angle $\beta$ with respect to the vertical, which angle $\beta$ is opposite to angle $\alpha$, in which second position the pipeline can also be launched from a storage reel into the sea. In the second position the tower may be inclined at a range of angles below vertical, opposite to the first position.

Thus, where a tower positioned at an edge of the vessel (the bow, the stern or a side of the vessel) is pivoted to include an acute angle with the deck in the first position, in the second position the tower includes an obtuse angle with the deck. Analogously, the tower may include an obtuse angle with the deck in the first position and an acute angle in the second position. In a preferred embodiment, the pipeline launch tower is positioned at the stern of the vessel and is pivotable between a position in which the tower is positioned inclined with respect to the bow with 65° to a second position in which the tower is leaning backwards and extending over the stern with 15°.

In a preferred embodiment according to the fifth aspect of the invention the marine pipeline installation further comprises a hang off module for clamping and supporting the weight of previously launched pipeline supported below the lowermost position of the A&R trolley.

A sixth aspect of the invention relates to a marine pipeline installation system, preferably for laying an offshore pipeline and/or installing a subsea riser. Such a system comprises a vessel having a bow and a stern, which vessel may be suitable to carry out the reel lay method, laying rigid or flexible pipelines, but may also be suitable to carry out the J-lay method.

The system further comprises a pipeline launch tower comprising pipe laying equipment defining a tower firing line, which tower is mounted pivotably on said vessel. The tower is adapted for launching the pipeline in the firing line in the direction of the seabed in a first position of the tower in which the tower is at an angle $\alpha$ with respect to the vertical. The pipe laying equipment may comprise tensioners, e.g. when the tower is used for reel laying operations, and may furthermore include welding stations and line-up tools, e.g. when the tower is used for J-lay operations. Furthermore, the pipe laying equipment may include clamps such as a hang off module clamp provided in a hang off module.

Such a tower is often placed adjacent or over a moonpool of the vessel, or at another suitable location, e.g. at the stern of the vessel. In general the term tower here refers to a raised structure on the vessel, and may e.g. be designed as a reel lay ramp. Alternatively or in addition, the tower may be formed by an A-frame.

A hang off module is supported in the lower part of the firing line to support a previously launched pipeline. Such a hang off module may be allowed to engage with the launched pipeline, e.g. by clamping. In a possible embodiment, the hang off module is supported by the vessel and comprises associated hang off module pivoting means to pivot the hang off module together with or independent of the tower. In an alternative embodiment, the hang off module is supported by the pipeline launch tower and is pivotable together with the tower.

The pipeline launch tower supports an abandonment and recovery (A&R) system comprising at least one A&R cable and a sheave arrangement, comprising one or more A&R sheaves. Such A&R system can be used for lowering the launched pipeline, accessories, or launched pipeline provided with an accessory. Examples of such accessories are pipeline end terminals (PLET's) and connectors. Preferably, the A&R sheave arrangement is provided at an upper position of the pipeline launch tower, such that the accessory is positionable below the sheave arrangement.

The sixth aspect of present invention aims to provide an improved marine pipelaying system, or at least an alternative system. The invention further aims to provide improved pipeline installation methods.

According to the sixth aspect of the invention the A&R system is mounted to the tower essentially opposite the pipe laying equipment such that it defines an A&R line remote and opposite from the tower firing line. Further, according to the sixth aspect of the invention the hang off module is displaceable by hang off module displacement means from its position in the tower firing line to a position in the A&R line.

This allows the A&R system to operate remote from the firing line. This is in particular beneficial when the space available in the tower firing line is limited, and large accessories are to be handled. Preferably, the A&R line extends well beyond the stern or the bow of the vessel, or beyond the gangways. It is envisaged that at least a few decimeters distance is created between the tower firing line and the A&R line. Large, oversized accessories such as PLETs, which e.g. do not fit in between the legs of the pipeline launch tower or ramp may thus be installed at a remote launch trajectory: the A&R line. As it is preferred to assemble accessories in the pipeline, the launched pipeline has to be translated into the A&R line, which is achieved by displacement of the hang off module with the launched pipeline by the hang off module displacement means. Thus, the trajectory in which the pipeline is launched is displaced from the tower firing line to the A&R line.

In a preferred embodiment of the invention according to the sixth aspect, the pipeline launch tower is pivotable to a second position in which the tower is at an angle β with respect to the vertical, which angle β is opposite to angle α, in which second position the pipeline can also be launched from a storage reel into the sea. In the second position the tower may be inclined at a range of angles below vertical, opposite to the first position.

Thus, where a tower positioned at an edge of the vessel (the bow, the stern or a side of the vessel) is pivoted to include an acute angle with the deck in the first position, in the second position the tower includes an obtuse angle with the deck. Analogously, the tower may include an obtuse angle with the deck in the first position and an acute angle in the second position. In a preferred embodiment, the pipeline launch tower is positioned at the stern of the vessel and is pivotable between a position in which the tower is positioned inclined with respect to the bow with 65° to a second position in which the tower is leaning backwards and extending over the stern with 15°.

An advantage of combining the fourth and sixth aspect of the invention is that it is possible to alter the A&R line by changing the inclination of the pipeline launch tower. This way, the distance between the A&R line and the tower firing line that has been used for launching the pipeline may be increased up to several meters. Rotating the pipeline launch tower enables the A&R line to extend well beyond the stern of the vessel, facilitating A&R operation such as the lowering of an accessory over the stern of the vessel, so that the accessory can easily pass the stern of the vessel.

Accessories may be stored on the deck area or alternatively on a barge. Such accessories are positioned in the A&R line, e.g. by a crane or an accessory handling device, or by mounting the accessories on special pallets which can skid over rails, or by a combination thereof. The accessory may be delivered to the accessory handling device by a crane, such as an offshore mast crane or a knuckle boom crane, or via an A&R cable in the A&R system. Possibly also the accessory handling device is skiddable into the A&R line.

Preferably, after the accessory is positioned in the A&R line, the accessory is lined up with the launched pipeline which is supported by the hang off module, e.g. using the accessory handling device or using a dedicated line-up tool (LUT), after which it can be welded to the launched pipeline. Alternatively, the PLET may be connected to a tail pipe yet to be launched.

According to a preferred embodiment, the A&R system comprises two sheaves and two wires, one of which is reeved through the pipeline launch trajectory while the other is reeved through the A&R line. This facilitates a reasonable A&R capacity in both firing lines.

Preferably the hang off module displacement means comprise a pair of rails substantially parallel to the deck and substantially parallel to the intended direction of movement of the vessel during pipelaying along which the hang off module can be translated from the tower firing line to the A&R line. Actuation means such as cylinders are preferably provided, though alternative actuation means are also conceivable.

It is preferred for such pipeline installation vessels to have a crane, preferably an offshore mast crane, provided on deck for performing various operations on deck, as well as from and to the vessel. The capacity of such crane may be several hundreds of tons. In preferred embodiments, the crane is used to move large objects to the pipeline launch trajectory.

In a preferred embodiment, the marine pipelaying system according to the sixth aspect of the present invention further comprises an abandonment and recovery sheave arrangement of which one or more sheaves are provided at an upper position of the pipeline launch tower, and one or more other sheaves of the A&R sheave arrangement are provided on an A&R trolley which is supported by the pipeline launch tower and moveable substantially parallel to the tower firing line. This embodiment further benefits from the advantages enumerated with respect to the fifth aspect of the invention above.

The above described marine pipeline installation system according to the sixth aspect of the invention is suitable for an exemplary A&R accessory handling operation in which an accessory is installed in the pipeline, which method comprises the following steps:

launching the pipeline in the tower firing line into the sea from the first position of the tower in which the tower is at an angle α with respect to the vertical, stopping the launch of pipeline, and hanging off the launched pipeline in the hang off module, displacing the hang off module with the launched pipeline from its position in the tower firing line to a position in the A&R line by the hang off module displacement means, positioning the accessory in the A&R line, attaching the accessory to the launched pipeline in the hang off module and to the at least one A&R cable, suspending the accessory and the launched pipeline from the A&R system, disengaging the hang off module from the launched pipeline, displacing the hang off module from its position in the A&R line to a position in the tower firing line by the hang off module displacement means, lowering the accessory with the launched pipeline by the A&R system.

In a preferred embodiment the pipeline launch tower or the marine pipeline installation system according to the sixth aspect of the invention the pipeline launch tower is pivotable to a second position in which the tower is at an angle β with respect to the vertical, which angle β is opposite to angle α, in which second position the pipeline can also be launched into the sea.

An advantage of combining the fourth and sixth aspect of the invention is that it is possible to alter the A&R line by changing the inclination of the pipeline launch tower. This way, the distance between the A&R line and the tower firing line that has been used for launching the pipeline may be increased up to several meters. Rotating the pipeline launch tower enables the A&R line to extend well beyond the stern of the vessel, facilitating A&R operation such as the lowering of an accessory over the stern of the vessel, so that the accessory can easily pass the stern of the vessel.

As such, the marine pipeline installation system according to the fourth and sixth aspect of the invention is suitable for an exemplary A&R accessory handling operation in which an accessory is installed in the pipeline, which method comprises the following steps:

launching the pipeline in the tower firing line into the sea from the first position of the tower in which the tower is at an angle α with respect to the vertical, stopping the launch of pipeline, and hanging off the launched pipeline in the hang off module, pivoting the pipeline launch tower to a second position in which the tower is at an angle β with respect to the vertical, displacing the hang off module with the launched pipeline from its position in the tower firing line to a position in the A&R line by the hang off module displacement means, positioning the accessory in the A&R line, attaching the accessory to the launched pipeline in the hang off module and to the at least one A&R cable, suspending the accessory and the launched pipeline from the A&R system, disengaging the hang off module from the launched pipeline, displacing the hang off module from its position in the A&R line to a position in the tower firing line by the hang off module displacement means, lowering the accessory with the launched pipeline by the A&R system.

When the accessory has passed the stern of the vessel the tower may be rotated back and the accessory can be lowered further to the seabed in the modified A&R line, which has been rotated together with the tower. Possibly the launched pipeline with the PLET is now abandoned to obtain a new stock of pipes or pipeline.

Preferably, the accessory is provided with a pipe end portion. Then, when the accessory has passed the stern of the vessel, the accessory is hang off module by the hang off module. The hang off module with suspended accessory, possibly a PLET connected to a launched pipeline, may subsequently be translated from the A&R line to the tower firing line. The above method is then followed by the following steps:

launching the accessory and the launched pipeline by the A&R cable until the pipe end portion is at the same height level as the position of the hang off module, displacing the hang off module from its position in the tower firing line to a position in the A&R line by the hang off module displacement means, engaging the pipe end portion to the hang off module, detaching the A&R cable from the accessory.

Now, the accessory and the launched pipeline are supported by the hang off module in the A&R line. Possibly, the hang off module is subsequently displaced back to its position in the tower firing line where another pipeline is attached to the pipe end portion and pipelaying continues.

The marine pipeline installation system according to the fourth and sixth aspect of the invention is further suitable for transferring a launched pipeline from a first marine pipeline installation system to a second marine system which comprises a winch and a cable. Such method preferably comprises the following steps:

launching the pipeline into the sea from the first position of the tower in which the tower is at an angle α with respect to the vertical, stopping the launch of pipeline, and hanging off the launched pipeline in the hang off module, pivoting the pipeline launch tower to the second position in which the tower is at an angle β with respect to the vertical, attaching both the at least one A&R cable and the cable of the second marine system to the launched pipeline, suspending the launched pipeline from the A&R system, disengaging the hang off module from the launched pipeline, launching the launched pipeline by the at least one A&R cable until the cable of the second marine system is taut, detaching the at least one A&R cable from the launched pipeline and support the launched pipeline from the winch of the second marine system.

A seventh aspect of the invention relates to a method for transferring a launched pipeline from a first marine pipeline installation system to a second marine system which comprises a winch and a cable.

The first marine pipeline installation system comprises:
a vessel,
a pipeline launch tower comprising pipe laying equipment defining a tower firing line, which tower is mounted pivotably on said vessel and which is adapted for launching the pipeline along the firing line into the sea in a first position of the tower in which the tower is at an angle α with respect to the vertical and wherein the pipeline launch tower is pivotable to a second position in which the tower is at an angle β with respect to the vertical, which angle β is opposite to angle α in which second position the pipeline can also be launched into the sea,
a hang off module supported in the lower part of the firing line for clamping and supporting the weight of previously launched pipeline,
an abandonment and recovery (A&R) system comprising at least one A&R cable and a sheave arrangement with one or more sheaves provided at an upper position in the firing line.

Such marine pipeline installation systems are well known in the art, preferably for laying an offshore pipeline and/or installing a subsea riser. Such a system comprises a vessel having a bow and a stern, which vessel may be suitable to carry out the reel lay method, laying rigid or flexible pipelines, but may also be suitable to carry out the J-lay method.

The system further comprises a pipeline launch tower comprising pipe laying equipment defining a tower firing line, which tower is mounted pivotably on said vessel. The pipe laying equipment may comprise tensioners, e.g. when the tower is used for reel laying operations, and may furthermore include welding stations and line-up tools, e.g. when the tower is used for J-lay operations. Furthermore, the pipe laying equipment may include clamps such as a hang off module clamp provided in a hang off module.

Such a tower is often placed adjacent or over a moonpool of the vessel, or at another suitable location, e.g. at the stern of the vessel. In general the term tower here refers to a raised structure on the vessel, and may e.g. be designed as a reel lay ramp. Alternatively or in addition, the tower may be formed by an A-frame.

A hang off module is supported in the lower part of the firing line to support a previously launched pipeline. Such a hang off module may be allowed to engage with the launched pipeline, e.g. by clamping. In a possible embodiment, the hang off module is supported by the vessel and comprises associated hang off module pivoting means to pivot the hang off module together with or independent of the tower. In an alternative embodiment, the hang off module is supported by the pipeline launch tower and is pivotable together with the tower.

The pipeline launch tower supports an abandonment and recovery (A&R) system comprising at least one A&R cable and a sheave arrangement, comprising one or more A&R sheaves. Such A&R system can be used for lowering the launched pipeline, accessories, or launched pipeline provided with an accessory. Examples of such accessories are pipeline end terminals (PLET's) and connectors. Preferably, the A&R sheave arrangement is provided at an upper position of the pipeline launch tower, such that the accessory is positionable below the sheave arrangement.

The seventh aspect of present invention aims to provide an improved method for transferring a launched pipeline from a first marine pipeline installation system to a second marine system which comprises a winch and a cable, or at least an alternative method.

The method according to the seventh aspect of the invention comprises the following steps:
  launching the pipeline into the sea from the first position of the tower in which the tower is at an angle α with respect to the vertical,
  stopping the launch of pipeline, and hanging off the launched pipeline in the hang off module,
  pivoting the pipeline launch tower to the second position in which the tower is at an angle β with respect to the vertical,
  attaching both the at least one A&R cable and the cable of the second marine system to the launched pipeline,
  suspending the launched pipeline from the A&R system,
  disengaging the hang off module from the launched pipeline,
  launching the launched pipeline by the at least one A&R cable until the cable of the second marine system is taut,
  detaching the at least one A&R cable from the launched pipeline and support the launched pipeline from the winch of the second marine system.

Such method is in particular beneficial for handing over pipeline and accessories that are bulky and/or heavy in weight.

It will be clear for the skilled person that the various aspects of the invention can be realized separately and/or in all possible combinations.

The present invention will be explained in greater detail with reference to the figures, in which:

FIGS. 1a-1e schematically show a marine pipeline installation system for performing a method for installing an accessory according to the first aspect of the invention;

FIGS. 2a-2b schematically show an alternative method for installing an accessory according to the first aspect of the invention;

FIGS. 3a-3b schematically show a second alternative method for installing an accessory according to the first aspect of the invention;

FIGS. 4a-4b schematically show a third alternative method for installing an accessory according to the first aspect of the invention;

FIGS. 5a-5d show a detail of a marine pipeline installation system according to a second aspect of the invention;

Figure 8:
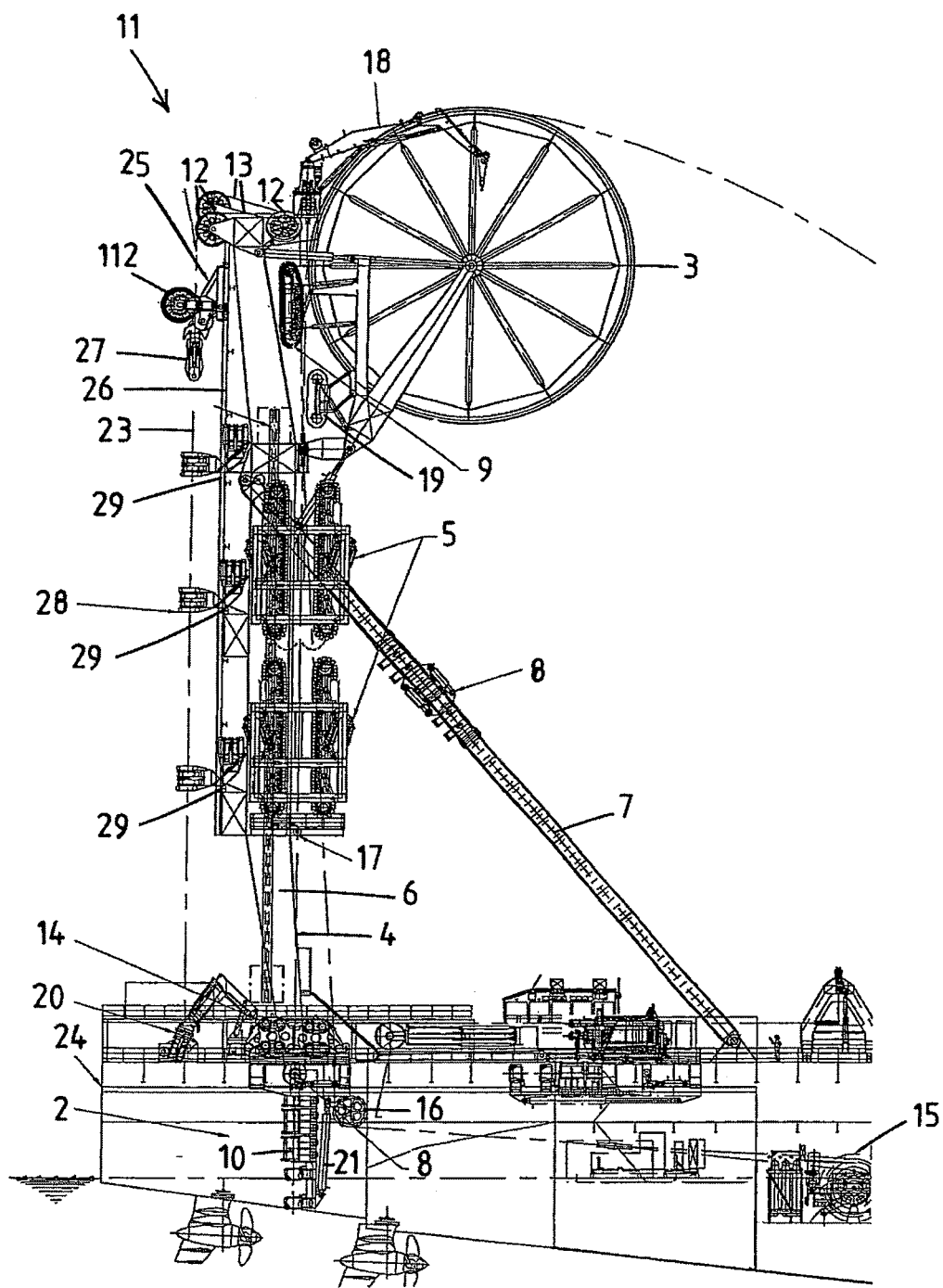
Figure 9:
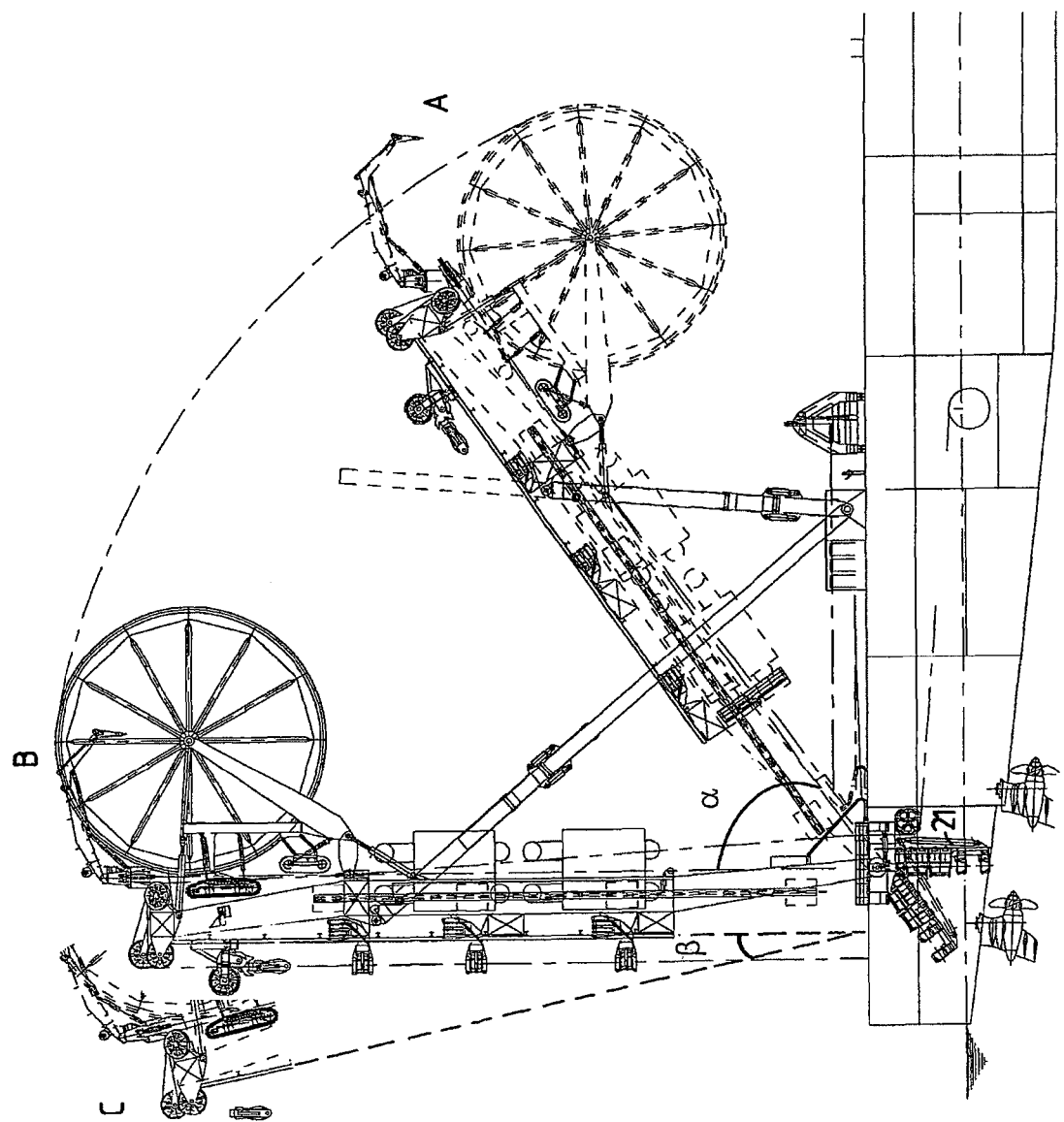
Figure 10:
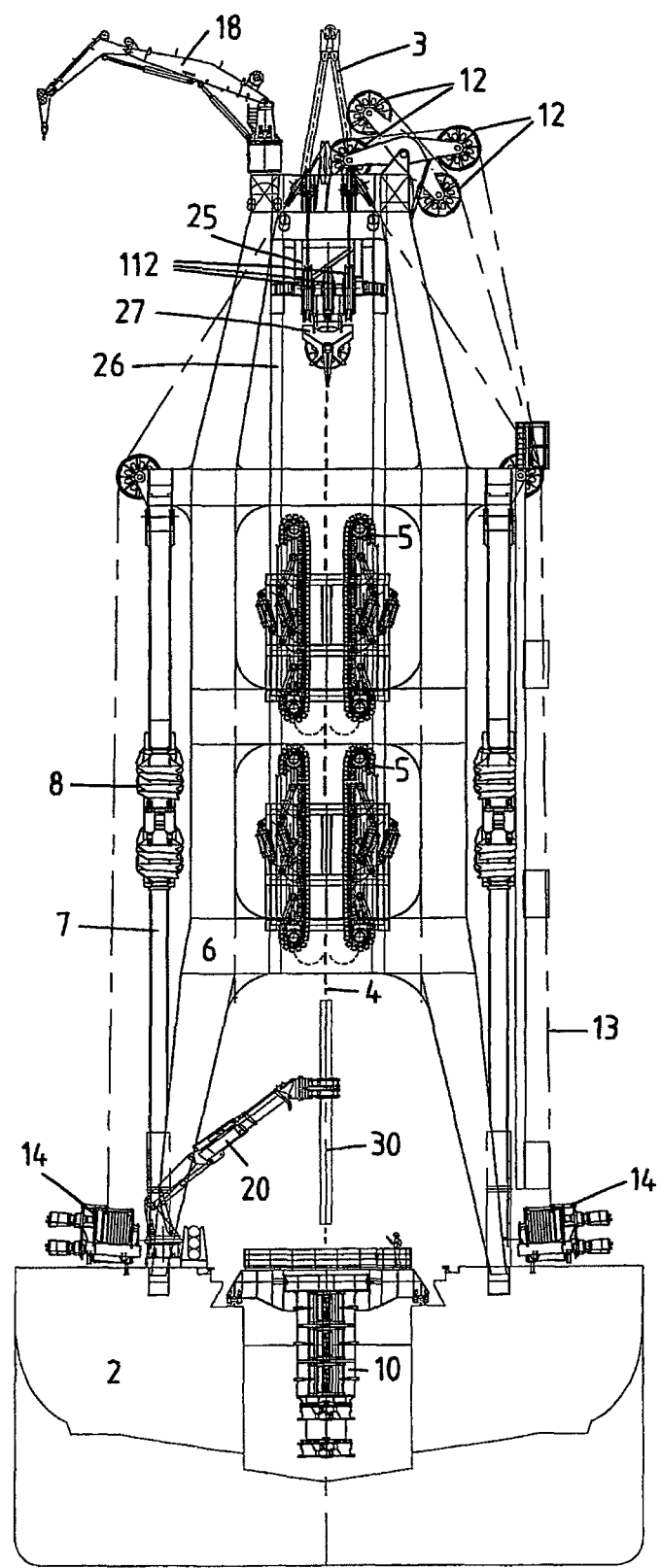

FIGS. 7a-7c schematically show an alternative detail of a marine pipeline installation system according to a third aspect of the invention;

FIG. 8 shows a side view of a reel-lay pipeline installation according to the fourth, fifth and sixth aspect of the present invention;

FIG. 9 shows the reel-lay pipeline installation of FIG. 8 in three positions according to the fourth aspect of the present invention, FIG. 10 shows the reel-lay pipeline installation of FIG. 8 in a rear view, FIG. 11 shows a stern of a floating vessel at least suitable for the reel lay method according to the seventh aspect of the invention;

FIGS. 12a-12e show part of the stern of a floating vessel according to FIG. 11.

In FIG. 1a is shown a marine pipeline installation system for laying an offshore pipeline comprising a vessel 202 with a hull 201, suitable to carry out the method according to the first aspect of the invention. In the hull 201 a moonpool 235 is provided at the stern of the vessel 202. Above the moonpool 235 is positioned a pipeline launch tower 206 having pipe laying equipment defining a tower firing line 204. The tower 206 is mounted pivotably on said vessel 202 and is adapted for launching a pipeline 231 along the tower firing line 204 into the sea in a first position X of the tower 206 in which the tower 206 is at an angle α with respect to the vertical. Adjustable connecting arm 207 adjusts and maintains the inclination of tower 206.

The marine pipeline installation system further comprises a hang off module 210 supported in the lower part of the tower firing line 204 for clamping and supporting the weight of the previously launched pipeline 231. In this embodiment, the hang off module 210 is pivotable together with tower 206.

An abandonment and recovery (A&R) system is provided comprising an A&R cable 213 and a sheave arrangement 212 with one or more sheaves provided at an upper position in the tower firing line 204. In FIG. 1a, A&R cable 213 is aligned along tower firing line 204.

The marine pipeline installation system further comprises an accessory handling device for positioning an accessory 232 between the hang off module 210 and the A&R sheave arrangement 212 in the tower firing line 204. For clarity reasons, this accessory handling device is omitted in FIGS. 1a-1e.

FIG. 1a shows the accessory 232, here comprising two pipe end portions 233 and 234. The pipe end portions 233 and 234 can be connected to the previously launched pipeline 231 or to other pipe sections. During normal operation, the marine pipeline installation system launches the pipeline 231 from the first position of the tower 206 with respect to the vertical, in a pipeline launch trajectory corresponding to the tower firing line 204 into the sea. To install accessory 232 onto the pipeline 231, the launch of the pipeline 231 is stopped, and the launched pipeline 231 is hang off module in hang off module 210, as shown in FIG. 1a.

The accessory handling device, which is not shown in FIGS. 1a-1e, subsequently positions the accessory 232 with pipe end portions 233 and 234 in the tower firing line 204 between the hang off module 210 and the A&R sheave assembly 212, as shown in FIG. 1b. In this embodiment, accessory 232 with pipe end portions 233 and 234 is positioned such that pipe end portion 234 is adjacent to the pipeline 231. An upside down orientation of accessory 232 with pipe end portions 233 and 234 is also possible.

In this embodiment, the pipe end portion 234 is attached to the launched pipeline 231 in the hang off module 210 and pipe end portion 233 is attached to A&R cable 213. It is also conceivable that an accessory 232 without pipe end portions 233 and 234 is installed on the pipeline 231. In that case, the accessory 232 is connected directly to pipeline 231 and the A&R cable 213 is also attached directly to the accessory 232.

A&R cable 213 is now hauled in until A&R cable 213 is taut and the accessory 232 with pipe end portions 233 and 234, and pipeline 231 are suspending from the A&R system. This allows the save disengagement of the launched pipeline 231 from the hang off module 210.

In FIG. 1c, the connecting arm 207 has been adjusted such that the tower 206 is pivoted to an accessory launch position Y in which the tower 206 is at an angle γ with respect to the vertical. The pipeline 231 in this position of the tower is considered to stay at the launch trajectory which is at an angle α as shown in FIG. 1c. In this embodiment, the angle between the tower firing line 204 of the tower 206 and the pipeline 231 is γ-α. However, due to the rotation to the accessory launch position and/or movement of the vessel 202, the angle between the pipeline 231 and the vertical can be different resulting in a different angle between the tower firing line 204 and the pipeline 231. Important for the launch of the accessory 232 is that angle γ differs substantially from angle α, so that a pipeline launch trajectory is created which is large enough for the accessory 232 with the pipe end portions 233 and 234 and the pipeline 231 to be launched with the A&R system at a distance from the tower 206. This is in particular beneficial when the space available in the tower firing line 204 is limited and large accessories are to be handled which can not pass through hang off module 210.

In FIG. 1d, the accessory 232 with pipe end portions 233 and 234, together with pipeline 231 is launched into the sea by the A&R system. The accessory 232 passes hang off module 210 at a distance thereof and is lowered through moonpool 235. It is conceivable that the pipeline 231 with the attached accessory 232 and pipe end portions 233 and 234 is abandoned and recovered later. Alternatively, as is shown in FIG. 1d, the accessory with pipe end portions 233 and 234, and pipeline 231 are launched by the A&R cable 213 until pipe end 233 is at the same height level as the position of the hang off module 210.

The connecting arm 207 is then adjusted such that the pipeline launch tower 206 is pivoted back to the first position X in which the tower 206 is at an angle α with respect to the vertical, such that the trajectory of the pipeline 231 again coincides with the tower firing line 204 of the tower, as shown in FIG. 1e. The pipe end portion 233 is allowed to engage with hang off module 210, such that the accessory with pipe end portions 233 and 234, and pipeline 231 suspend from the hang off module 210. The A&R cable 213 can now be detached from pipe end portion 233 to allow new pipe sections to be connected to the pipe end portion 233.

In the method shown in FIG. 1a-1e, tower 206 is pivoted from a first position X with an acute angle α with respect to the vertical towards the bow of the vessel 202 to an accessory launch position Y in the direction of the bow of the vessel 202 in which the tower 206 has a less acute angle γ with respect to the vertical towards the bow of the vessel 202.

However, many variants are possible.

Figures 2A, 2B:
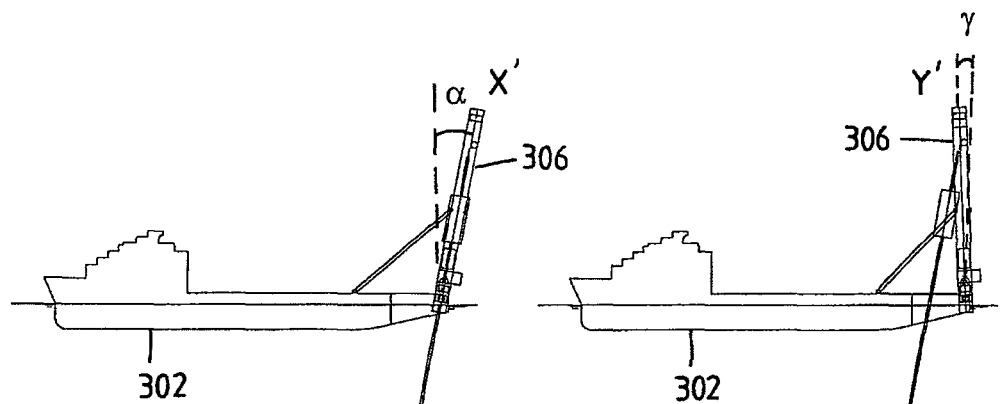

FIGS. 2a and 2b show a vessel 302 without a moonpool, provided with a pipeline launch tower 306 at the stern of the vessel 302. In FIG. 2a a first position X' of the tower 306 is shown having an angle α with respect to the vertical away from the bow of the vessel 302. FIG. 2b shows an accessory launch position Y', wherein the tower 306 has an angle γ with respect to the vertical towards the bow of the vessel 302.

Figures 3A, 3B:
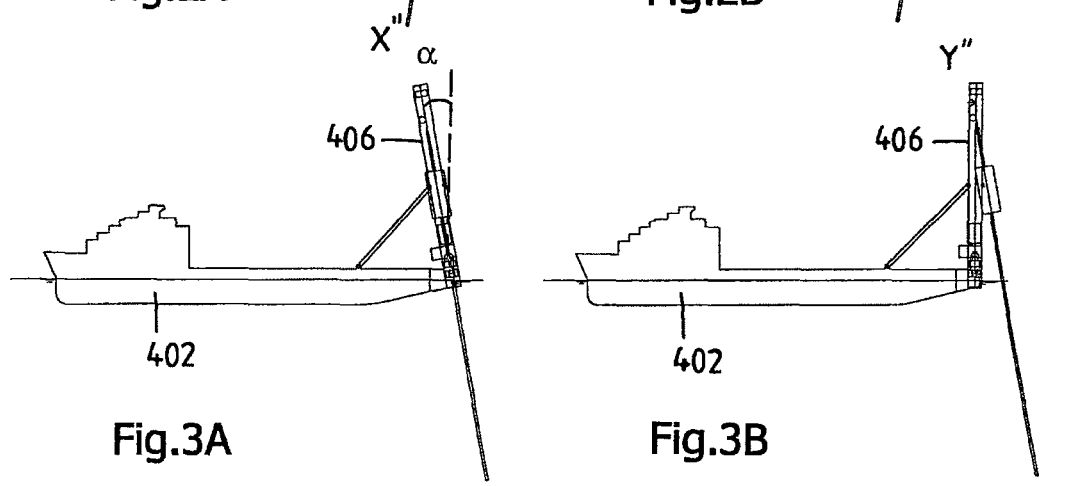

FIGS. 3a and 3b show another variant with respect to the two positions X and Y of a pipeline launch tower. FIG. 3a shows a vessel 402 provided with a pipeline launch tower 406 in a first position X" with the tower 406 having an angle α with respect to the vertical towards the bow of the vessel 402. FIG. 3b shows said tower 406 in an accessory launch position Y", wherein the tower 406 has substantially no angle γ with respect to the vertical and is thus positioned substantially vertically.

Figures 4A, 4B:
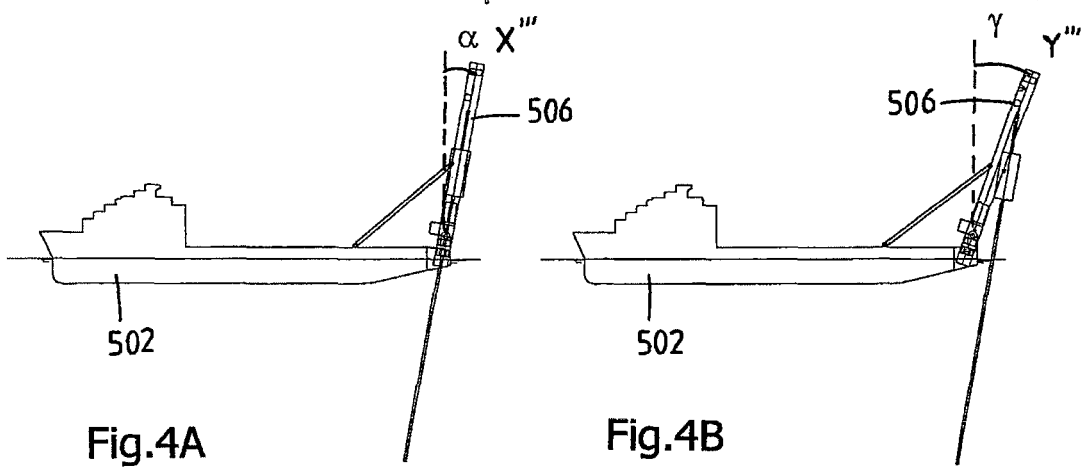

In yet another variant with respect to the two positions X and Y of a pipeline launch tower, FIG. 4a shows a vessel 502 provided with a pipeline launch tower 506 in a first position X''' with the tower 506 having an angle α with respect to the vertical away from the bow of the vessel 502. FIG. 4b shows said tower 506 in an accessory launch position Y''', wherein the tower 506 has an angle γ with respect to the vertical further away from the bow of the vessel 502.

It is conceivable that more variants are possible such as embodiments where the tower is positioned at a side of the vessel. The flexibility of such a marine pipeline installation system allows the system to adapt the angle of the pipeline launch trajectory and also allows the launch of an accessory onto the pipeline when little space is available.

Furthermore is it conceivable that the method and variants shown in the FIGS. 1-4 are also possible with positions X and Y of the pipeline launch tower having an obtuse angle with the vertical instead of the shown acute angles. Also combinations of acute and obtuse angles are possible.

In FIGS. 5a to 5d is shown a part of a marine pipeline installation system for laying an offshore pipeline according to the second aspect of the invention.

The marine pipeline installation system according to the second aspect of the invention comprises a vessel, which is not shown in either of the FIGS. 5a-5d. The system further comprises a pipeline launch tower 606 attached to said vessel, of which only the lower part is shown in FIGS. 5a-5d. The pipeline launch tower 606 comprises pipe laying equipment defining a tower firing line 604. The tower 606 is mounted pivotably about a tower pivot axis on said vessel and is adapted for launching a pipeline 631 in the tower firing line 604 into the sea at least in a first position of the tower 606 in which the tower is at an angle α with respect to the vertical, as shown in FIG. 5b.

The marine pipeline installation system further comprises a workstation 660 supported in the lower part of the pipeline launch tower 606, the workstation 660 comprising a working platform 661 supported by a support frame 663 as shown in FIG. 5a. This working platform 661 is accessible to personnel 662 (see FIG. 5b) to perform inspection operations etc.

Furthermore, the marine pipeline installation system comprises a hang off module (not shown) supported by the support frame 663 in the lower part of the tower firing line 604 for clamping and supporting the weight of previously launched pipeline 631.

The workstation 660 further comprises a support frame guide (670) substantially perpendicular to the tower pivot axis and substantially perpendicular to the tower firing line 604 along which the support frame 663 is skiddable, such that the working platform 661 and the hang off module are skiddable into and out of the tower firing line 604, indicated by the arrow T in FIGS. 5a and 5b.

FIG. 5a shows the working platform 661 in a position, in which the working platform 661 is positioned out of the tower firing line 604. In this way, the working platform 661 does not interfere with passing accessories or thickenings of the pipeline 631.

FIG. 5b shows the working platform 661 in a position, in which the working platform 661 is positioned into the tower firing line 604. As can be seen, personnel 662 can get near the pipeline 631 through working platform 661. In this embodiment, the working platform 661 is positioned horizontally, such that personnel 662 can naturally walk around working platform 661.

FIGS. 5c and 5d show the pipeline launch tower 606 at other angles with respect to the vertical, respectively at a substantially vertical position of the tower 606 in FIG. 5c, and at an angle opposite to angle α of FIG. 5b in FIG. 5d. Also in these positions the working platform stays in a horizontal position. This is possible because between the trolley 663 and the working platform 661 a platform axis 664 parallel to the tower pivot axis is provided. This enables the working platform 661 to gimbal maintaining a horizontal position independent of the position of the tower 606. A relative movement of the working platform 661 with respect to the tower 606 can be achieved by gimbal means comprising preferably a cylinder or a gear wheel with motor.

FIG. 5a also shows that working platform 661 comprises two platform portions 661a and 661b between which a swinging axis parallel to the tower pivot axis is provided, such that the platform portion 661b closest to the tower firing line 604 can be swung back so as to clear the area around the tower firing line 604 when the working platform 661 is in the position out of the tower firing line 661. In this embodiment, the swinging axis coincides with platform axis 664. It is also conceivable that the swinging axis is located elsewhere, e.g. between platform axis 664 and the end of platform portion 661b.

Figure 6A:
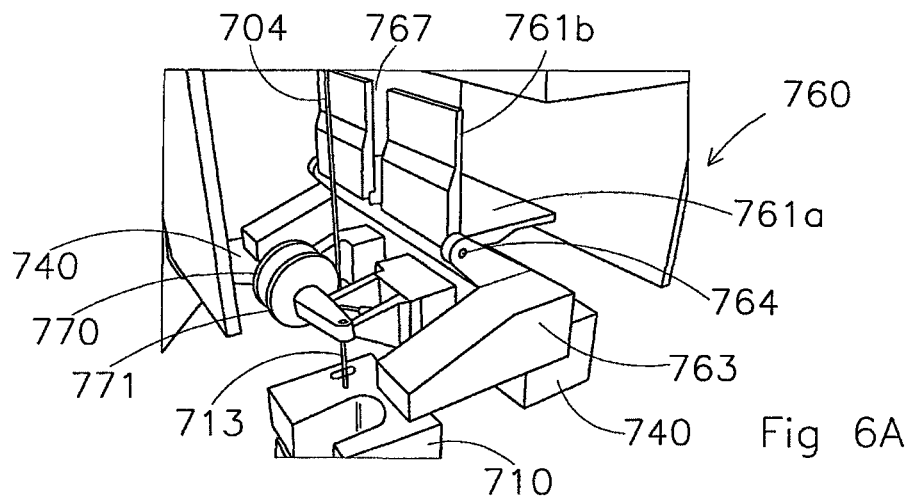
FIGS. 6a-6c show a detail of a marine pipeline installation system according to a third aspect of the invention.
Figure 6B:
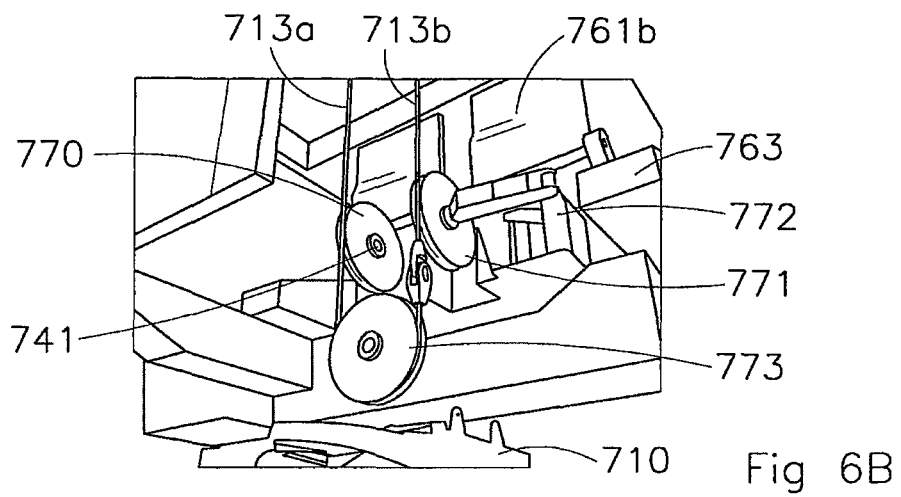
Figure 6C:
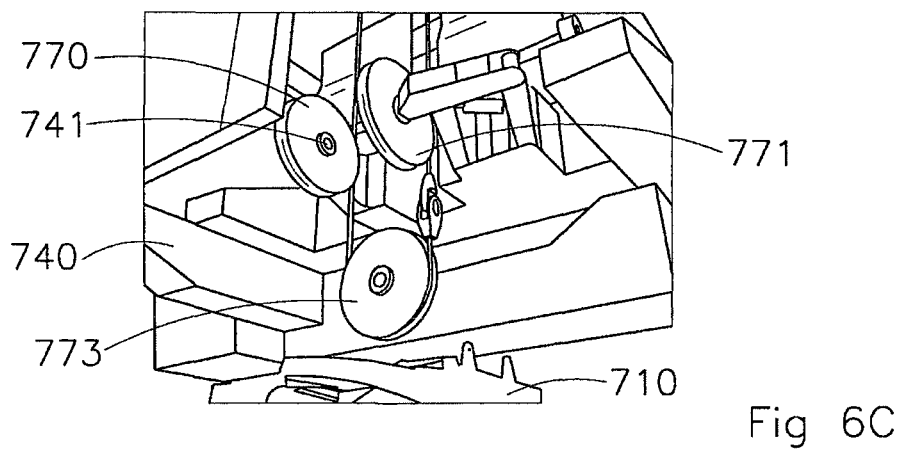

FIGS. 6a-6c show a part of a marine pipeline installation system for laying an offshore pipeline comprising a vessel (not shown) and a pipeline launch tower (also not shown). As shown in FIG. 6a, the tower comprises pipe laying equipment defining a tower firing line 704, which tower is mounted pivotably about a tower pivot axis on said vessel and which is adaptable for launching a pipeline (not shown) in the tower firing line 704 into the sea in a first position of the tower in which the tower is at an angle α with respect to the vertical. The inclination α may be in the range between 0 and 70°, more preferably between 0 and 15°, whereby an inclination of 0° corresponds to a vertical orientation of the pipeline launch tower. In the FIGS. 6a-6c, the tower is positioned in a substantially vertical position in which α is 0°.

The system further comprises an abandonment and recovery (A&R) system comprising at least one A&R cable 713 and a sheave arrangement with one or more sheaves supported by the pipeline launch tower. In this embodiment, two sheaves 770, 771 are supported by a support frame 763. The support frame 763 is skiddable along a support frame guide (740) provided in a lower part of the pipeline launch tower, which guide is substantially perpendicular to the tower pivot axis and substantially perpendicular to the tower firing line 704, such that the two sheaves 770, 771 are skiddable into and out of the tower firing line 704.

Furthermore, FIG. 6a shows a hang off module 710 supported in the lower part of the tower firing line 704 for clamping and supporting the weight of previously launched pipeline. Not shown in this embodiment is that the hang off module 710 is supported by the support frame 763, such that the hang off module 710 is skiddable into and out of the tower firing line 704, together with the sheaves 770,771.

Sheave 770 is not moveable with respect to support frame 763 and can only rotate about its own sheave pivot axis 741 substantially parallel to the tower pivot axis. On the other hand, sheave 771 is movably supported by the support frame 763 by mechanism 772, such that the sheave 771 is movable in a direction substantially parallel to the tower pivot axis. Sheave 771 is in FIG. 6a lined up with A&R cable 713 to guide the A&R cable 713.

In FIG. 6a, the support frame is located in a workstation 760. This workstation 760 further comprises a working platform 761 also supported by the support frame 763, such that the working platform 761 is skiddable into and out of the tower firing line 704. The working platform 761 is accessible to personnel to perform inspection operations etc.

Between the support frame 763 and the working platform 761 a platform pivot axis 764 parallel to the tower pivot axis is provided, such that the working platform 761 can gimbal maintaining a substantially horizontal position independent of the position of the tower. This relative movement between the working platform 761 and the tower is achieved by gimbal means, which comprise for instance a cylinder or a gear wheel and motor (not shown).

Further, the working platform 761 comprises two platform portions 761a and 761b between which a swinging axis parallel to the tower pivot axis is provided, such that the platform portion 761b closest to the tower firing line 704 can be swung back so as to clear the area around the tower firing line 704. In this embodiment, the swinging axis coincides with platform pivot axis 764. It is also conceivable that the swinging axis is located between platform axis 764 and the end of platform portion 761b.

A slot 767 is provided in platform portion 761b to receive the A&R cable 713 or a pipeline and enable an almost 360° inspection area.

The advantage of the support frame 763 being skiddable into and out of the tower firing line 704 is that in case of the passage of an accessory or thickening in the pipeline, the support frame 763 can be moved to clear the area around the tower firing line 704, such that the working platform 761, hang off module 710 and sheaves 770 and 771 do not interfere with the passing of the accessory or thickening in the pipeline.

In FIG. 6b, another configuration of the system of FIG. 6a is shown. The A&R system has been adapted to a double fall system and comprises two A&R cables 713a and 713b. In this way, the load suspended by the A&R system is divided over two A&R cables 713a and 713b and heavier loads can be suspended. The two A&R cables 713a and 713b are connected to each other and run over an equilizing sheave 773.

The support frame 763 has been skidded to a position in which the A&R cables 713a and 713b are guided by an opposite side of the sheaves 770 and 771 than the sheave 771 shown in FIG. 6a. Also, sheave 771 has moved in a direction substantially parallel to the tower pivot axis, to be ligned up with A&R cable 713b. Preferably, the A&R cables 713a and 713b are placed symmetrically with respect to the tower firing line 704.

FIG. 6c shows sheaves 770 and 771 are positioned in the double fall system, such that sheave 770 guides A&R cable 713a, and sheave 771 guides cable 713b. In FIG. 6c support frame 763 has skidded such that both sheaves 770 and 771 guide the A&R cables 713a and 713b at an opposite side of the sheave as shown in FIG. 6b.

FIG. 7a shows an alternative support frame 863 movably supporting two sheaves 870 and 871 to be used in a marine pipeline installation system for laying an offshore pipeline according to the third aspect of the invention.

The sheaves 870 and 871 are used to guide abandonment and recovery (A&R) cables from an A&R system. The support frame is supported in the lower part of a pipeline launch tower, which comprises pipe laying equipment defining a tower firing line and a tower pivot axis to pivot the tower. The support frame 863 is skiddable along a support frame guide (not shown) substantially perpendicular to the tower pivot axis and substantially perpendicular to the tower firing line, as indicated by arrow T'. Sheaves 870 and 871 are supported by support frame 863 through respectively mechanisms 874 and 872. These mechanisms 874 and 872 allow a substantially parallel movement to the tower pivot axis of the sheaves 870 and 871. This movement is achieved by the actuation of cylinders 875 and 876.

In this embodiment, the support frame 863 further comprises a welding station 880, which makes the marine pipeline installation system in particular suitable for the J-lay method.

FIG. 7a shows the sheaves 870 and 871 positioned in a one cable guide position, wherein sheave 870 is lined up with an A&R cable 813. In this one cable guide position, the sheave 870 guides the A&R cable 813. It is also possible for sheave 870 to guide the A&R cable 813 on the other side of the sheave 870. Which side is required depends on the angle of the tower.

Mechanism 874 and 872 are provided with guide blocks 890 and corresponding guide block cylinders 891 to move the guide blocks. The guide blocks 890 are movable between a position, wherein the sheaves 870 and 871 can receive an A&R cable, and a position wherein an A&R cable is locked up between the sheave 870 or 871 and the guide block 890. Other means to move the guide blocks 890 and mechanisms 874 and 872 are also possible.

In FIG. 7b, the sheaves 870 and 871 are moved by cylinders 875 and 876 to a double fall A&R system, wherein the sheaves 870 and 871 guide two A&R cables 813a and 813b which are placed symmetrically. It is also possible that the two sheaves 870 and 871 guide the A&R cables on the other side of the sheaves 870, 871.

FIG. 7c shows a position wherein both sheaves 870 and 871 are misaligned with A&R cables 813a and 813b. In a possible scenario, the support frame 863 can now move to the left. In this way, sheaves 870 and 871 pass the A&R cables 813a and 813b. When the sheaves 870 and 871 have passed the A&R cables 813a and 813b, the sheaves 870 and 871 can be moved back to the two cable guide position as shown in FIG. 7b, with the difference that the sheaves 870 and 871 are now at the other side of the A&R cables. The guide blocks 890 on the right side of the sheaves can be moved by cylinders 891 to lock up the A&R cables 813a and 813b.

In FIG. 8 a stern of a floating vessel 2 at least suitable for carrying out the reel lay method is shown, comprising features according to the fourth, fifth and sixth aspect of the invention. The vessel is provided with a pipeline launch tower 6, which tower 6 is connected pivotally to the vessel 2 by hinge part 8, defining an essentially horizontal pivot axis. The inclination of the tower 6 is adjustable and can be maintained by connecting arm 7 and adjusters 8. The tower comprises pipe laying equipment defining a firing line 4 along which a pipe may be launched, at least from a first position of the tower in which the tower is at an angle with respect to the vertical.

Near the top of the tower 6 a pipeline guide wheel 3 or other guide structure is mounted, which serves to guide the pipeline from a storage reel (not shown here) to the firing line 4 along the tower 6. During normal reel lay operation continuous pipeline extends from said guide wheel 3 in said firing line 4 in the direction to the seabed (not shown).

The pipelaying equipment on the tower 6 comprises, in the shown embodiment, two tensioners 5 downstream of the guide wheel 3. Below the lower tensioner 5 a platform 17 is provided in the shown embodiment. Between the upper tensioner 5 and the guide wheel 3 also a pipeline straightener 9 and a pipeline centralizer 19 are provided. A knuckle boom crane 18 is in this embodiment provided at the top of the tower 6.

In the shown embodiment a hang off module 10 is supported directly from the hull of the vessel 2. It could be envisaged that said hang off module is mounted at a lower end of the tower 6. The hang off module 10 is adapted to support the weight of the previously launched pipeline.

An abandonment and recovery (A&R) system 11 is provided in the pipeline launch tower 6, here it is mounted at an upper position thereof The A&R system 11 comprises multiple sheaves 12 and multiple A&R cables 13. The A&R system 11 is operated by A&R winches 14 provided on the vessel 2. Redundant A&R cable 13 may be stored in A&R storage 15 in the vessel 2 and guided to winches 14 via sheave 16.

In the shown embodiment, an optional crane 20 is provided. This is clearly shown in the rear view of FIG. 10 in which a pipe section 30 is held by the knuckle boom crane 20 in the firing line 4. Such crane 20 may also be used for accessory handling, e.g. for positioning an accessory in the firing line of the tower.

According to the fourth aspect of the invention, the pipeline launch tower 6 is pivotable between a first position in which the tower 6 is positioned inclined at an angle α with respect to the vertical, and a second position in which the tower 6 is positioned inclined at an angle β with respect to the vertical, which angle β is opposite to angle α, which tower 6 allows launching of the pipeline on both extreme and intermediate positions.

In FIG. 9 the reel-lay pipeline installation of FIG. 8 is show in three different positions according to the fourth aspect of the present invention: an inclined position A in which the tower 6 is inclined with respect to the bow and is at an angle α with respect to the vertical, a position B in which the tower 6 is positioned perpendicular to the vessel 2, hence, with a vertical orientation, and a third position C in which the tower 6 is positioned inclined with respect to the stern and is at an angle β with respect to the vertical. In the embodiment of the reel-lay pipeline installation shown in FIGS. 8 and 9, the hang off module 10 is supported by the vessel 2. The hang off module is pivotable together with the tower 6 via associated hang off module pivoting means 21, here embodied as a cylinder.

According to the fifth aspect of the invention a sheave 112 of the A&R sheave arrangement 11 is provided on a trolley 25 which is supported by the pipeline launch tower 6 and moveable substantially parallel to the tower firing line 4, in the shown embodiment via rails 26. To the A&R wire 13 an A&R underwater hook 27 is provided in this embodiment, which is provided with an equalizing sheave.

Optional tail handling rollers 28 are provided in the A&R line 23, which may guide a tail pipe hanging from the pipeline guide 3 yet to be launched. These tail handling rollers 28 may be pivoted out of the A&R line 23, via pivot axes 29. In FIGS. 8 and 9, both positions in and out of the A&R line 23 are indicated.

According to the sixth aspect of the invention the A&R sheave arrangement 11 extends from the pipeline launch tower 6 defining an A&R line 23 remote from and opposite to the tower firing line 4. The hang off module 10 is displaceable along hang off module rails 24 from a position in the firing line 4 (as shown in FIG. 8) to a position in the A&R line 23 (not shown).

In FIG. 11 is shown a stern of a floating vessel 102 at least according to the seventh aspect of the invention. The shown vessel 102 is at least suitable for carrying out the reel lay method. The vessel is provided with a pipeline launch tower 106, which tower 106 is connected pivotally to the vessel 102 by hinge part 108, defining an essentially horizontal pivot axis. The tower comprises pipe laying equipment defining a firing line 104 along which a pipe may be launched, at least from a first position of the tower in which the tower is at an angle with respect to the vertical. When the tower 106 is not in operation, the tower 106 can be pivoted towards the vessel 102, to rest on tower support 141.

Near the top of the tower 106 a pipeline guide wheel 103 or other guide structure is mounted, which serves to guide the pipeline from a storage reel 142 to the firing line 104 along the tower 106. The pipe laying equipment on the tower 106 comprises, in the shown embodiment, two tensioners 105 downstream of the guide wheel 103. During normal reel lay operation a continuous pipeline extends from the storage reel 142 to said guide wheel 103, and from said guide wheel 103 to the tensioners 105 in said firing line 104.

In the shown embodiment a hang off module 110 is supported directly from the hull of the vessel 102. It could be envisaged that said hang off module is mounted at a lower end of the tower 106. The hang off module 110 is adapted to support the weight of a previously launched pipeline 131. The hang off module 110 comprises pivoting means to pivot the hang off module together with or independent of the tower 106. The pivoting means comprise a cylinder 121 to pivot the hang off module 110.

An abandonment and recovery (A&R) system 111 is provided in the pipeline launch tower 106. The A&R system 111 comprises a sheave 212 and an A&R cable 113. An A&R underwater hook 127 is provided on the cable 113 in this embodiment. Sheave 212 is mounted at an upper position of the pipeline launch tower 106, remote from and opposite to the tower firing line 104 to form an A&R line 123 according to the sixth aspect of the invention. However, for performing the method according to the seventh aspect of the invention, a distinct A&R line is not a requisite.

The A&R underwater hook 127 in this embodiment is connected to a hoisting block (not shown), which in FIG. 11 is engaged with a trolley 125, according to the fifth aspect. Trolley 125 also is not a requisite for performing the method according to the seventh aspect of the invention. A&R cable 113 extends between the hoisting block (not shown) and an A&R winch (not shown). The trolley 125 is movably supported by tower 106, so that the trolley 125 can be moved up and down along the tower 106. When the hoisting block engages with the trolley 125, the A&R underwater hook 127 is allowed to move together with the trolley 125 substantially parallel to the tower 106.

According to the seventh aspect of the invention, the pipeline launch tower 106 is pivotable between a first position in which the tower 106 is positioned inclined at an angle α with respect to the vertical (not shown), and a second position in which the tower 106 is positioned inclined at an angle β with respect to the vertical, which angle β is opposite to angle α. The tower 106 in FIG. 11 is positioned in the second position.

According to the seventh aspect of the invention, the launched pipeline 131 from FIG. 11 can be transferred from the vessel 102 to a second marine system 150 as shown in the FIGS. 12a-12e. It is conceivable that second marine system 150 is a platform, vessel or other pipeline installation system.

During normal reel lay operation, the pipeline 131 is launched into the sea preferably from the first position of the tower 106 in which the tower 106 is at an angle α with respect to the vertical, such as shown in FIG. 9. To initiate the transfer of the pipeline 131 from the vessel 102 to the second marine system 150, the launch of the pipeline 131 is stopped and the launched pipeline 131 is hang off module in hang off module 110 which is aligned with tower 106, as shown in FIG. 12a. Subsequently, the pipeline launch tower 106 is pivoted to the second position in which the tower is at an angle β with respect to the vertical. This position is shown in FIG. 12a and allows the vessel 102 to move backwards and approach the second marine system 150.

According to the sixth aspect of the invention, the hang off module 110 of this shown embodiment is displaceable along hang off module rails 124 from a position in the firing line 104 (as shown in FIG. 12a) to a position in the A&R line 123 (as shown in FIG. 12b). This allows the A&R system 150 to operate remote from the firing line 104. This is advantageous for instance when the available space in the tower firing line 104 is limited and large accessories are to be handled (not shown). The steps described below are also possible when A&R line 123 substantially coincides with firing line 104. Then, the displacement of hang off module 110 is not a necessary step for transferring the pipeline 131 to the second marine system 150.

In FIG. 12b, the A&R underwater hook 127 has been moved downwards along the A&R line 123. The hook 127 is connected to a hoisting block (not shown) which is engaged with the trolley 125. The trolley 125 guides the hoisting block with hook 127, suspended by the A&R cable 113, along A&R line 123.

In FIG. 12c, a connection cable 155 connects the pipeline 131 to A&R underwater hook 127, and a cable 151 of the second marine system 150 connects the pipeline 131 to the second marine system 150. This is done in such a way that the cable 151 of the second marine system 150 is slack.

In this embodiment, first the A&R winch is actuated such that A&R cable 113 is stretched and the pipeline 131 is suspended from the A&R system. Then the hoisting block (not shown) is allowed to disengage from the trolley 125, and the hang off module 110 disengages from the pipeline 131.

Figure 12D:
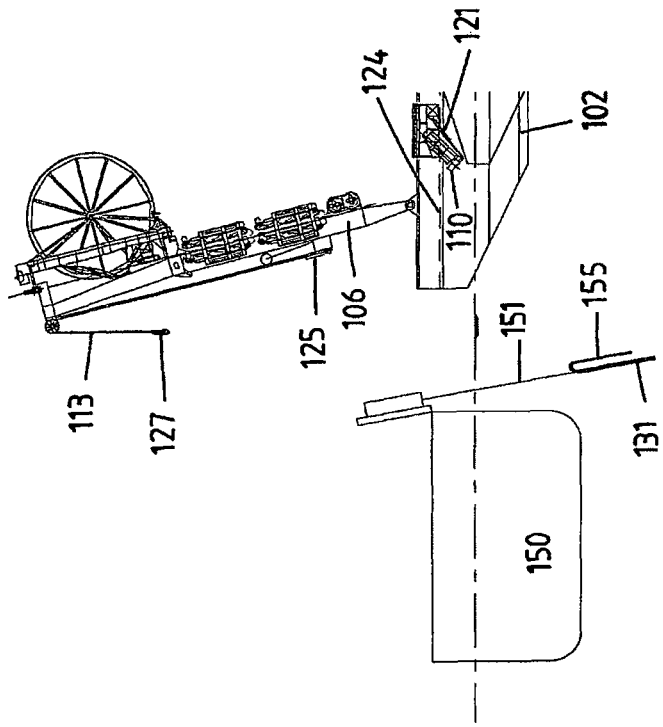

In FIG. 12d, the hang off module 110 has been displaced along hang off module rails 124 from its position in the A&R line 123 via its position in the firing line 104 (as shown in FIG. 12a) to a rest position beyond firing line 104. In this rest position cylinder 121 is extended such that the hang off module 110 is at an angle with the vertical, here opposite of the angle the tower 106 has with the vertical, to mainly adapt the orientation of the hang off module to the surface of vessel 102. In this way, hang off module 110 makes room in the area below tower 106.

The A&R cable 113 is paid out to launch the pipeline 131 until the second cable 151 is taut.

Figure 12E:
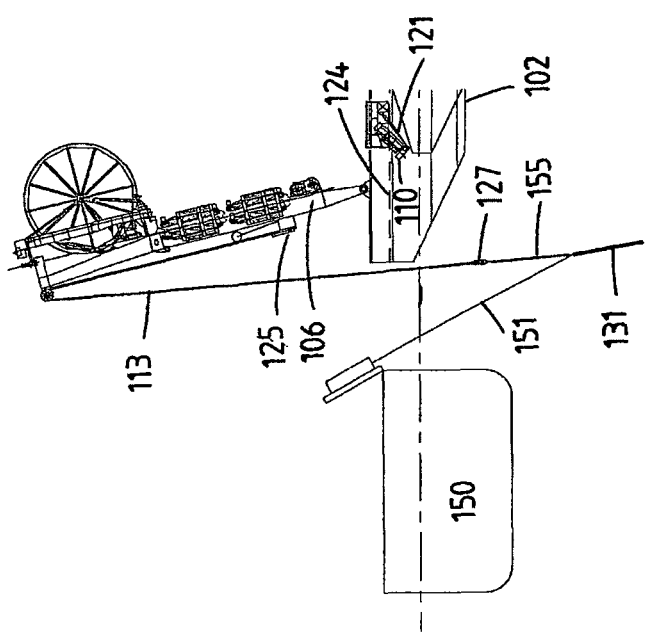

In FIG. 12e, the A&R underwater hook 127 is disconnected from the first cable 155 and the pipeline 131 is now only connected to the second marine system 150. A&R cable 113 can now be hauled in by the A&R winch (not shown). It is not shown, but if necessary, second cable 151 can also be hauled in by the second marine system 150 to get to pipeline 131.

The invention claimed is:

1. A method for transferring a launched pipeline from a first marine pipeline installation system to a second marine system which comprises a winch and a cable, the method comprising the following steps:
using the first marine pipeline installation system, wherein the first marine pipeline installation system for laying an offshore pipeline comprises:
a vessel,
a pipeline launch tower comprising pipe laying equipment defining a tower firing line, wherein the pipeline launch tower is mounted pivotably on said vessel and is adapted for launching the pipeline along the firing line into the sea in a first position of the pipeline launch tower in which the pipeline launch tower is at an angle α with respect to the vertical and wherein the pipeline launch tower is pivotable to a second position in which the pipeline launch tower is at an angle β with respect to the vertical, wherein the angle β is opposite to the angle α, and in the second position the pipeline can also be launched into the sea,
a hang off module supported in the lower part of the firing line for clamping and supporting the weight of previously launched pipeline, and
an abandonment and recovery (A&R) system comprising at least one A&R cable and a sheave arrangement with one or more sheaves provided at an upper position in the firing line,
launching the pipeline into the sea from the first position of the pipeline launch tower in which the pipeline launch tower is at the angle α with respect to the vertical,
stopping the launch of pipeline, and hanging off the launched pipeline in the hang off module,
pivoting the pipeline launch tower to the second position in which the pipeline launch tower is at the angle β with respect to the vertical,
attaching both the at least one A&R cable and the cable of the second marine system to the launched pipeline,
suspending the launched pipeline from the A&R system,
disengaging the hang off module from the launched pipeline,
launching the launched pipeline by the at least one A&R cable until the cable of the second marine system is taut, and
detaching the at least one A&R cable from the launched pipeline and support the launched pipeline from the winch of the second marine system.

2. A method for laying an offshore pipeline from a marine pipeline installation system, the method comprising the following steps:
using the marine pipeline installation system, wherein the marine pipeline installation system comprises:
a vessel,
one or more storage reels for storage of pipeline to be installed, and
a pipeline launch tower comprising pipe laying equipment defining a firing line, wherein the pipeline launch tower is mounted pivotably on said vessel and is adapted for launching the pipeline from a storage reel via the firing line into the sea in a first position of the pipeline launch tower in which the pipeline launch tower is at an angle α with respect to the vertical, the pipeline launch tower being pivotable to a second position in which the pipeline launch tower is at an angle β with respect to the vertical, wherein the angle β is opposite to the angle α, wherein the pipeline launch tower in the second position is also adapted for launching the pipeline from a storage reel into the sea; wherein the pipe laying equipment comprises:
a pipeline guide supported at an elevated position by the pipeline launch tower; and
one or more tensioners, each tensioner comprising multiple tracks adapted for engaging the pipeline and supporting at least part of the weight of the launched pipeline, the one or more tensioners being supported by the pipeline launch tower,
in a forward movement of the vessel launching the pipeline into the sea from the first position of the pipeline launch tower in which the pipeline launch tower is at the angle α with respect to the vertical,
pivoting the pipeline launch tower to the second position in which the pipeline launch tower is at the angle β with respect to the vertical, and
in a rearward movement of the vessel launching the pipeline into the sea from the second position of the tower in which the tower is at the angle β with respect to the vertical.

3. The method according to claim 2, wherein the marine pipeline installation system further comprises a pivotable hang off module supported below the tensioners for clamping and supporting the weight of previously launched pipeline, wherein the pivotable hang off module is pivotable at least between the angle α with respect to the vertical and the opposed angle β with respect to the vertical, and wherein the method further comprises the step of pivoting the pivotable hang off module.

4. A method for transferring a launched pipeline from a first marine pipeline installation system to a second marine system which comprises a winch and a cable, the method comprising the following steps:
using the first marine pipeline installation system, the first marine pipeline installation system comprising:
a vessel,
one or more storage reels for storage of pipeline to be installed,
a pipeline launch tower comprising pipe laying equipment defining a firing line, wherein the pipeline launch tower is mounted pivotably on said vessel and is adapted for launching the pipeline from a storage reel via the firing line into the sea in a first position of the pipeline launch tower in which the pipeline launch tower is at an angle α with respect to the vertical, the pipeline launch tower being pivotable to a second position in which the pipeline launch tower is at an angle β with respect to the vertical, wherein the angle β is opposite to the angle α, wherein the pipeline launch tower in the second position is also adapted for launching the pipeline from a storage reel into the sea, wherein the pipe laying equipment comprises:
a pipeline guide supported at an elevated position by the pipeline launch tower; and
one or more tensioners, each tensioner comprising multiple tracks adapted for engaging the pipeline and supporting at least part of the weight of the launched pipeline, the one or more tensioners being supported by the pipeline launch tower, and
a pivotable hang off module supported below the tensioners for clamping and supporting the weight of previously launched pipeline, wherein the pivotable hang off module is pivotable at least between the angle α with respect to the vertical and the opposed angle β with respect to the vertical, in a forward movement of the vessel launching the pipeline into the sea from the first position of the pipeline launch tower in which the pipeline launch tower and the pivotable hang off module are at the angle α with respect to the vertical, stopping the launch of pipeline, and hanging off the launched pipeline in the pivotable hang off module, pivoting the pipeline launch tower and the pivotable hang off module to the second position in which the pipeline launch tower is at the angle β with respect to the vertical, in a rearward movement of the vessel launching the pipeline into the sea from the second position of the pipeline launch tower in which the pipeline launch tower is at the angle β with respect to the vertical, attaching a cable of the second marine system to the launched pipeline, suspending the launched pipeline from the cable, and disengaging the pivotable hang off module from the launched pipeline.

5. A marine pipeline installation system for laying an offshore pipeline into a sea, said marine pipeline installation system at least being adapted to carry out a reel lay method, wherein the marine pipeline installation system comprises:

a vessel, one or more storage reels for storage of pipeline to be installed, a pipeline launch tower comprising pipe laying equipment defining a firing line, wherein the pipeline launch tower is mounted pivotably on said vessel and is adapted for launching the pipeline from a storage reel via the firing line into the sea in a first position of the pipeline launch tower in which the pipeline launch tower is at an angle α with respect to the vertical, the pipeline launch tower being pivotable to a second position in which the pipeline launch tower is at an angle β with respect to the vertical, wherein the angle β is opposite to angle α, wherein the pipeline launch tower in the second position is also adapted for launching the pipeline from a storage reel into the sea, wherein the pipe laying equipment comprises:

a pipeline guide supported at an elevated position by the pipeline launch tower; and one or more tensioners, each tensioner comprising multiple tracks adapted for engaging the pipeline and supporting at least part of the weight of the launched pipeline, the one or more tensioners being supported by the pipeline launch tower, and a pivotable hang off module supported below the tensioners for clamping and supporting the weight of previously launched pipeline, wherein the pivotable hang off module is pivotable at least between the angle α with respect to the vertical and the opposed angle β with respect to the vertical.

6. The marine pipeline installation system according to claim 5, wherein the pivotable hang off module is supported by the pipeline launch tower.

7. The marine pipeline installation system according to claim 5, wherein the pivotable hang off module is supported by the vessel, and wherein an associated hang off module pivoting device is provided.

8. The marine pipeline installation system according to claim 5, wherein a hang off module displacement device is provided, which is adapted to displace the pivotable hang off module from its position in the tower firing line to a remote position.

9. The marine pipeline installation system according to claim 5, further comprising an abandonment and recovery (A&R) system comprising at least one A&R cable and a sheave arrangement with one or more sheaves supported by the pipeline launch tower.

10. The marine pipeline installation system according to claim 5, wherein the pipeline launch tower is provided at the stern of the vessel.

11. The marine pipeline installation system according to claim 10, wherein in the first position the pipeline launch tower is positioned inclined with respect to the bow and in the second position the pipeline launch tower is leaning backwards over the stern.

12. The marine pipeline installation system according to claim 11, wherein in the first position the pipeline launch tower is positioned inclined with respect to the bow with 65° and in the second position the pipeline launch tower is leaning backwards over the stern with 15°.

* * * * *